(12) United States Patent
Kweon

(10) Patent No.: US 8,553,069 B2
(45) Date of Patent: *Oct. 8, 2013

(54) METHOD AND APPARATUS FOR OBTAINING PANORAMIC AND RECTILINEAR IMAGES USING ROTATIONALLY SYMMETRIC WIDE-ANGLE LENS

(76) Inventor: Gyeongil Kweon, Gwangju (KR)

(*) Notice: Subject to any disclaimer, the term of this patent is extended or adjusted under 35 U.S.C. 154(b) by 759 days.

This patent is subject to a terminal disclaimer.

(21) Appl. No.: 12/670,095

(22) PCT Filed: Jul. 24, 2008

(86) PCT No.: PCT/KR2008/004338
§ 371 (c)(1),
(2), (4) Date: Jan. 21, 2010

(87) PCT Pub. No.: WO2009/017331
PCT Pub. Date: Feb. 5, 2009

(65) Prior Publication Data
US 2010/0208032 A1    Aug. 19, 2010

(30) Foreign Application Priority Data

Jul. 29, 2007   (KR) .................. 10-2007-0076113
Sep. 10, 2007   (KR) .................. 10-2007-0091373
Jul. 22, 2008   (KR) .................. 10-2008-0071106

(51) Int. Cl.
*H04N 7/00* (2011.01)
*H04N 7/18* (2006.01)

(52) U.S. Cl.
USPC .................... 348/36; 348/335; 345/647

(58) Field of Classification Search
USPC .............................................. 348/36
See application file for complete search history.

(56) References Cited

U.S. PATENT DOCUMENTS 5,185,667 A   2/1993   Zimmermann
5,384,588 A   1/1995   Martin et al.
(Continued)

FOREIGN PATENT DOCUMENTS

JP        2005056295 A    3/2005
KR     1020070061033 A    6/2007
(Continued)

OTHER PUBLICATIONS

International Search Report of International Application No. PCT/KR2008/004338.

(Continued)

*Primary Examiner* — Tung Vo
*Assistant Examiner* — Obafemi Sosanya
(74) *Attorney, Agent, or Firm* — John K. Park; Park Law Firm

(57) ABSTRACT

The present invention provides mathematically accurate image processing algorithms for extracting natural looking panoramic images and distortion-free rectilinear images from images acquired using a camera equipped with a wide-angle lens which is rotationally symmetric about an optical axis and devices implementing such algorithms. Imaging systems using this method can be used not only in security•surveillance applications for indoor and outdoor environments, but also in diverse areas such as video phone for apartment entrance door, rear view camera for vehicles, visual sensor for unmanned aerial vehicles and robots, camera phone, PC camera, and broadcasting camera. Also, it can be used to obtain panoramic or rectilinear photographs using a digital camera.

9 Claims, 23 Drawing Sheets

(56) References Cited

U.S. PATENT DOCUMENTS

| | | | |
|---|---|---|---|
| 5,684,937 | A | 11/1997 | Oxaal |
| 6,005,611 | A | 12/1999 | Gullichsen et al. |
| 6,271,853 | B1 | 8/2001 | Oxaal |
| 6,356,297 | B1 | 3/2002 | Cheng et al. |
| 7,161,616 | B1* | 1/2007 | Okamoto et al. ............. 348/148 |
| 2005/0036054 | A1* | 2/2005 | Mino et al. ............... 348/333.01 |
| 2005/0259118 | A1* | 11/2005 | Mojaver et al. ............... 345/647 |
| 2006/0023105 | A1* | 2/2006 | Kostrzewski et al. ........ 348/335 |
| 2006/0036054 | A1* | 2/2006 | Upshaw et al. ................. 528/44 |
| 2011/0181689 | A1* | 7/2011 | Kweon ........................... 348/37 |

FOREIGN PATENT DOCUMENTS

| | | | |
|---|---|---|---|
| KR | 1020080037530 | A | 4/2008 |
| KR | 1020090012290 | A | 2/2009 |
| KR | 100888922 | B1 | 3/2009 |
| WO | 2005013001 | A2 | 2/2005 |
| WO | 2006112927 | A2 | 10/2006 |

OTHER PUBLICATIONS

J. F. Blinn and M. E. Newell, "Texture and reflection in computer generated images", Communications of the ACM, 19, 542-547 (1976).

N. Greene, "Environment mapping and other applications of world projections", IEEE Computer Graphics and Applications, 6, 21-29 (1986).

E. W. Weisstein, "Cylindrical Projection", http://mathworld.wolfram.com/CylindricalProjection.html.

W. D. G. Cox, "An introduction to the theory of perspective—part 1", The British Journal of Photography, 4, 628-634 (1969).

G. Kweon, K. Kim, Y. Choi, G. Kim, and S. Yang, "Catadioptric panoramic lens with a rectilinear projection scheme", Journal of the Korean Physical Society, 48, 554-563 (2006).

G. Kweon, Y. Choi, G. Kim, and S. Yang, "Extraction of perspectively normal images from video sequences obtained using a catadioptric panoramic lens with the rectilinear projection scheme", Technical Proceedings of the 10th World Multi-Conference on Systemics, Cybernetics, and Informatics, 67-75 (Olando, Florida, USA, Jun. 2006).

N. L. Max, "Computer graphics distortion for IMAX and OMNIMAX projection", Proc. NICOGRAPH, 137-159 (1983).

P. D. Bourke, "Synthetic stereoscopic panoramic images", Lecture Notes in Computer Graphics (LNCS), Springer, 4270, 147-155 (2006).

G. Kweon, Y. Choi, and M. Laikin, "Fisheye lens for image processing applications", Journal of the Optical Society of Korea, 12, 79-87 (2008).

W. K. Pratt, Digital Image Processing, 3rd edition (John Wiley, New York, 2001), Chap. 19.

\* cited by examiner

METHOD AND APPARATUS FOR OBTAINING PANORAMIC AND RECTILINEAR IMAGES USING ROTATIONALLY SYMMETRIC WIDE-ANGLE LENS

TECHNICAL FIELD

The present invention generally relates to mathematically precise image processing methods of extracting distortion-free rectilinear images and panoramic images, which appear most natural to the naked eye, from images acquired using a camera equipped with a wide-angle lens that is rotationally symmetric about an optical axis, as well as devices using the methods.

BACKGROUND ART

Panoramic camera, which captures the 360° view of scenic places such as tourist resorts, is an example of a panoramic imaging system. Panoramic imaging system is an imaging system that captures the views one could get by making one complete turn-around from a given spot. On the other hand, omnidirectional imaging system captures the view of every possible direction from a given position. Omnidirectional imaging system provides a view that a person could observe from a given position by turning around as well as looking up and down. In a mathematical terminology, the solid angle of the region that can be captured by the imaging system is $4\pi$ steradian.

There have been a lot of studies and developments of panoramic imaging systems not only in the traditional areas such as photographing buildings, nature scenes, and heavenly bodies, but also in security/surveillance systems using CCD (charge-coupled device) or CMOS (complementary metal-oxide-semiconductor) cameras, virtual touring of real estates, hotels and tourist resort, and navigational aids for mobile robots and unmanned aerial vehicles (UAV).

One method of obtaining a panoramic image is to employ a fisheye lens with a wide field of view (FOV). For example, the entire sky and the horizon can be captured in a single image by pointing a camera equipped with a fisheye lens with 180° FOV toward the zenith (i.e., the optical axis of the camera is aligned perpendicular to the ground plane). On this reason, fisheye lenses have been often referred to as "all-sky lenses". Particularly, a high-end fisheye lens by Nikon, namely, 6 mm f/5.6 Fisheye-Nikkor, has a FOV of 220°. Therefore, a camera equipped with this lens can capture a portion of the backside of the camera as well as the front side of the camera. Then, panoramic image can be obtained from thus obtained fisheye image after proper image processing.

In many cases, imaging system is installed on vertical walls. Imaging systems installed on outside walls of a building for the purpose of monitoring the surroundings, or a rear view camera for monitoring the backside of a passenger car are such examples. In such cases, it is inefficient if the horizontal field of view is significantly larger than 180°. This is because a wall, which is not needed to be monitored, takes up a large space in the monitor screen. Pixels are wasted in this case, and screen appears dull. Therefore, a horizontal FOV around 180° is more appropriate for such cases. Nevertheless, a fisheye lens with 180° FOV is not desirable for such application. This is because the barrel distortion, which accompanies a fisheye lens, evokes psychological discomfort and abhorred by the consumer.

An example of an imaging system, which can be installed on an interior wall for the purpose of monitoring the entire room, is given by a pan•tilt•zoom camera. Such a camera is comprised of a video camera, which is equipped with an optical zoom lens, mounted on a pan•tilt stage. Pan is an operation of rotating in the horizontal direction for a given angle, and tilt is an operation of rotating in the vertical direction for a given angle. In other words, if we assume that the camera is at the center of a celestial sphere, then pan is an operation of changing the longitude, and tilt is an operation of changing the latitude. Therefore, the theoretical range of pan operation is 360°, and the theoretical range of tilt operation is 180°. The shortcomings of a pan•tilt•zoom camera include high price, large size and heavy weight. Optical zoom lens is large, heavy and expensive due to the difficulty in design and the complicated structure. Also, a pan•tilt stage is an expensive device no cheaper than a camera. Therefore, it cost a considerable sum of money to install a pan•tilt•zoom camera. Furthermore, since a pan•tilt•zoom camera is large and heavy, this point can become a serious impediment to certain applications. Examples of such cases include airplanes where the weight of the payload is of critical importance, or a strict size limitation exists in order to install a camera in a confined space. Furthermore, pan•tilt•zoom operation takes a time because it is a mechanical operation. Therefore, depending on the particular application at hand, such a mechanical operation may not be fast enough.

References 1 and 2 provide fundamental technologies of extracting an image having a particular viewpoint or projection scheme from an image having other than the desirable viewpoint or projection scheme. Specifically, reference 2 provides an example of a cubic panorama. In short, a cubic panorama is a special technique of illustration wherein the observer is assumed to be located at the very center of an imaginary cubic room made of glass, and the outside view from the center of the glass room is directly transcribed on the region of the glass wall where the ray vector from the object to the observer meets the glass wall. An example of a more advanced technology is provided in the above reference with which reflections from an arbitrarily shaped mirrored surface can be calculated. Specifically, the author of reference 2 created an imaginary lizard having a highly reflective mirror-like skin as if made of a metal surface, then set-up an observer's viewpoint separated from the lizard, and calculated the view of the imaginary environment reflected on the lizard skin from the viewpoint of the imaginary observer. However, the environment was not a real environment captured by an optical lens, but a computer-created imaginary environment captured with an imaginary distortion-free pinhole camera.

On the other hand, an imaging system is described in reference 3 that is able to perform pan•tilt•zoom operations without a physically moving part. The said invention uses a camera equipped with a fisheye lens with more than 180° FOV in order to take a picture of the environment. Then, user designates a principal direction of vision using various devices such as a joystick, upon which, the computer extracts a rectilinear image from the fisheye image that could be obtained by heading a distortion-free camera to that particular direction. The main difference between this invention and the prior arts is that this invention creates a rectilinear image corresponding to the particular direction the user has designated using devices such as a joystick or a computer mouse. Such a technology is a core technology in the field of virtual reality, or when it is desirable to replace mechanical pan•tilt•zoom camera, and the keyword is "interactive picture". In this technology, there are no physically moving parts in the camera. As a consequence, the system response is fast, and there is less chance of mechanical failure.

Ordinarily, when an imaging system such as a security camera is installed, a cautionary measure is taken so that a vertical line perpendicular to the horizontal plane also appears vertical in the acquired image. In such a case, vertical lines still appear vertical even as mechanical pan•tilt•zoom operation is performed. On the other hand, in the said invention, vertical lines generally do not appear as vertical lines after a software pan•tilt•zoom operation has been performed. To remedy such an unnatural result, a rotate operation is additionally performed, which is not found in a mechanical pan•tilt•zoom camera. Furthermore, the said invention does not provide the exact amount of rotate angle, which is needed in order to display vertical lines as vertical lines. Therefore, the rotation angle must be found in a trial-and-error method in order to display vertical lines as vertical lines.

Furthermore, the said invention assumes that the projection scheme of the fisheye lens is an ideal equidistance projection scheme. But, the real projection scheme of a fisheye lens generally shows a considerable deviation from an ideal equidistance projection scheme. Since the said invention does not take into account the distortion characteristics of the real lens, images obtained after image processing still shows distortion.

The invention described in reference 4 remedies the shortcoming of the invention described in reference 3, namely the inability of taking into account the real projection scheme of the fisheye lens used in image processing. Nevertheless, the defect of not showing vertical lines as vertical lines in the monitor screen has not been resolved.

From another point of view, all animals and plants including human are bound on the surface of the earth due to the gravitational pull, and most of the events, which need attention or cautionary measure, take place near the horizon. Therefore, even though it is necessary to monitor every 360° direction on the horizon, it is not as important to monitor high along the vertical direction, for example, as high as to the zenith or deep down to the nadir. Distortion is unavoidable if we want to describe the scene of every 360° direction on a two-dimensional plane. Similar difficulty exists in the cartography where geography on earth, which is a structure on the surface of a sphere, needs to be mapped on a planar two-dimensional atlas. Among all the distortions, the distortion that appears most unnatural to the people is the distortion where vertical lines appear as curved lines. Therefore, even if other kinds of distortions are present, it is important to make sure that such a distortion is absent.

Described in reference 5 are the well-known map projection schemes among the diverse map projection schemes such as equi-rectangular projection, Mercator projection and cylindrical projection schemes, and reference 6 provides a brief history of diverse map projection schemes. Among these, the equi-rectangular projection scheme is the projection scheme most familiar to us when we describe the geography on the earth, or when we draw the celestial sphere in order to make a map of the constellation.

Referring to FIG. 1, if we assume the surface of the earth or the celestial sphere is a spherical surface with a radius S, then an arbitrary point Q on the earth's surface has a longitude $\psi$ and a latitude $\delta$. On the other hand, FIG. 2 is a schematic diagram of a planar map drawn according to the equi-rectangular projection scheme. A point Q on the earth's surface having a longitude $\psi$ and a latitude $\delta$ has a corresponding point P" on the planar map (234) drawn according to the equi-rectangular projection scheme. The rectangular coordinate of this corresponding point is given as (x", y"). Furthermore, the reference point on the equator having a longitude 0° and a latitude 0° has a corresponding point O" on the planar map, and this corresponding point O" is the origin of the rectangular coordinate system. Here, according to the equi-rectangular projection scheme, the same interval in the longitude (i.e., the same angular distance along the equator) corresponds to the same lateral interval on the planar map. In other words, the lateral coordinate x" on the planar map (234) is proportional to the longitude.

Math Figure 1

$$x'' = c\psi \qquad [\text{Math.1}]$$

Here, c is proportionality constant. Also, the longitudinal coordinate y" is proportional to the latitude, and has the same proportionality constant as the lateral coordinate.

Math Figure 2

$$y'' = c\delta \qquad [\text{Math.2}]$$

The span of the longitude is 360° ranging from −180° to +180°, and the span of the latitude is 180° ranging from −90° to +90°. Therefore, a map drawn according to the equi-rectangular projection scheme must have a width W:height H ratio of 360:180=2:1.

Furthermore, if the proportionality constant c is given as the radius S of the earth, then the width of the said planar map is given as the perimeter of the earth measured along the equator as given in Eq. 3.

Math Figure 3

$$W = 2\pi S \qquad [\text{Math.3}]$$

Such an equi-rectangular projection scheme appears as a natural projection scheme considering the fact that the earth's surface is close to the surface of a sphere. Nevertheless, it is disadvantageous in that the size of a geographical area is greatly distorted. For example, two very close points near the North Pole can appear as if they are on the opposite sides of the earth in a map drawn according to the equi-rectangular projection scheme.

n the other hand, in a map drawn according to the Mercator projection scheme, the longitudinal coordinate is given as a complex function given in Eq. 4.

Math Figure 4

$$y'' = c\ln\left\{\tan\left(\frac{\pi}{4} + \frac{\delta}{2}\right)\right\} \qquad [\text{Math. 4}]$$

On the other hand, FIG. 3 is a conceptual drawing of a cylindrical projection scheme or a panoramic perspective. In a cylindrical projection scheme, an imaginary observer is located at the center N of a celestial sphere (331) with a radius S, and it is desired to make a map of the celestial sphere centered on the observer, the map covering most of the region excluding the zenith and the nadir. In other words, the span of the longitude must be 360° ranging from −180° to +180°, but the range of the latitude can be narrower including the equator within its span. Specifically, the span of the latitude can be assumed as ranging from −Δ to +Δ, and here, Δ must be smaller than 90°.

In this projection scheme, a hypothetical cylindrical plane (334) is assumed which contacts the celestial sphere (331) at the equator (303). Then, for a point Q($\psi$, $\delta$) on the celestial sphere having a given longitude $\psi$ and a latitude $\delta$, a line segment connecting the center of the celestial sphere and the point Q is extended until it meets the said cylindrical plane. This intersection point is designated as P($\psi$, $\delta$). In this manner, the corresponding point P on the cylindrical plane (334)

can be obtained for every point Q on the celestial sphere (331) within the said latitude range. Then, a map having a cylindrical projection scheme is obtained when the cylindrical plane is cut and flattened out. Therefore, the lateral coordinate x" of the point P on the flattened-out cylindrical plane is given by Eq. 5, and the longitudinal coordinate y" is given by Eq. 6.

Math Figure 5

$$x''=S\psi \qquad [\text{Math.5}]$$

Math Figure 6

$$y''=S\tan\delta \qquad [\text{Math.6}]$$

Such a cylindrical projection scheme is the natural projection scheme for a panoramic camera that produces a panoramic image by rotating in the horizontal plane. Especially, if the lens mounted on the rotating panoramic camera is a distortion-free rectilinear lens, then the resulting panoramic image exactly follows a cylindrical projection scheme. In principle, such a cylindrical projection scheme is the most accurate panoramic projection scheme. However, the panoramic image appears unnatural when the latitude range is large, and thus it is not widely used in practice. Unwrapped panoramic image thus produced and having a cylindrical projection scheme has a lateral width W given by Eq. 3. On the other hand, if the range of the latitude is from $\delta_1$ to $\delta_2$, then the longitudinal height of the unwrapped panoramic image is given by Eq. 7.

Math Figure 7

$$H=S(\tan\delta_2-\tan\delta_1) \qquad [\text{Math.7}]$$

Therefore, the following equation can be derived from Eq. 3 and Eq. 7.

Math Figure 8

$$\frac{W}{H} = \frac{2\pi}{\tan\delta_2 - \tan\delta_1} \qquad [\text{Math. 8}]$$

Therefore, an unwrapped panoramic image following a cylindrical projection scheme must satisfy Eq. 8.

All the animals, plants and inanimate objects such as buildings on the earth are under the influence of gravity, and the direction of gravitational force is the up-right direction or the vertical direction. Ground plane is fairly perpendicular to the gravitational force, but needless to say, it is not so on a slanted ground. Therefore, the word "ground plane" actually refers to the horizontal plane, and the vertical direction is the direction perpendicular to the horizontal plane. Therefore, even if we refer them as the ground plane, the lateral direction, and the longitudinal direction, for the sake of simplicity, the ground plane must be understood as the horizontal plane, the vertical direction must be understood as the direction perpendicular to the horizontal plane, and the horizontal direction must be understood as a direction parallel to the horizontal plane, whenever an exact meaning of a term needs to be clarified.

Panoramic lenses described in references 7 and 8 take panoramic images in one shot with the optical axis of the panoramic lens aligned vertical to the ground plane. A cheaper alternative to the panoramic image acquisition method by the previously described camera with a horizontally-rotating lens consist of taking an image with an ordinary camera with the optical axis horizontally aligned, and repeating to take pictures after horizontally rotating the optical axis by a certain amount. Four to eight pictures are taken in this way, and a panoramic image with a cylindrical projection scheme can be obtained by seamlessly joining the pictures consecutively. Such a technique is called stitching. Quick-Time VR from Apple computer inc. is commercial software supporting this stitching technology. This method requires a complex, time-consuming, and elaborate operation of precisely joining several pictures and correcting the lens distortion.

According to the reference 9, another method of obtaining a panoramic or an omnidirectional image is to take a hemispherical image by horizontally pointing a camera equipped with a fisheye lens with more than 180° FOV, and then point the camera to the exact opposite direction and take another hemispherical image. By stitching the two images acquired from the camera using appropriate software, one omnidirectional image having the view of every direction (i.e., $4\pi$ steradian) can be obtained. By sending thus obtained image to a geographically separated remote user using communication means such as the Internet, the user can select his own viewpoint from the received omnidirectional image according to his own personal interest, and image processing software on the user's computing device can extract a partial image corresponding to the user-selected viewpoint, and a perspectively correct planar image can be displayed on the computing device. Therefore, through the image processing software, the user can make a choice of turning around (pan), looking-up or down (tilt), or take a close (zoom in) or remote (zoom out) view as if the user is actually at the specific place in the image. This method has a distinctive advantage of multiple users accessing the same Internet site to be able to take looks along the directions of their own choices. This advantage cannot be enjoyed in a panoramic imaging system employing a motion camera such as a pan•tilt camera.

References 10 and 11 describe a method of obtaining an omnidirectional image providing the views of every direction centered on the observer. Despite the lengthy description of the invention, however, the projection scheme provided by the said references is one kind of equidistance projection schemes in essence. In other words, the techniques described in the documents make it possible to obtain omnidirectional images from a real environment or from a cubic panorama, but the obtained omnidirectional image follows an equidistance projection scheme only and its usefulness is thus limited.

On the other hand, reference 12 provides an algorithm for projecting an Omnimax movie on a semi-cylindrical screen using a fisheye lens. Especially, taking into account of the fact that the projection scheme of the fisheye lens mounted on a movie projector deviates from an ideal equidistance projection scheme, a method is described for locating the position of the object point on the film corresponding to a certain point on the screen whereon an image point is formed. Therefore, it is possible to calculate what image has to be on the film in order to project a particular image on the screen, and such an image on the film is produced using a computer. Especially, since the lens distortion is already reflected in the image processing algorithm, a spectator near the movie projector can entertain himself with a satisfactory panoramic image. Nevertheless, the real projection scheme of the fisheye lens in the said reference is inconvenient to use because it has been modeled with the real image height on the film plane as the independent variable, and the zenith angle of the incident ray as the dependent variable. Furthermore, unnecessarily, the real projection scheme of the fisheye lens has been modeled only with an odd polynomial.

Reference 13 provides examples of stereo panoramic images produced by Professor Paul Bourke. Each of the panoramic images follows a cylindrical projection scheme, and a panoramic image of an imaginary scene produced by a computer as well as a panoramic image produced by a rotating slit camera are presented. For panoramic images produced by a computer or produced by a traditional method of rotating slit camera, the lens distortion is not an important issue. However, rotating slit camera cannot be used to take a real-time panoramic image (i.e., movie) of a real world.

References 14 and 15 provide an example of a fisheye lens with 190° FOV, and reference 16 provides various examples of wide-angle lenses including dioptric and catadioptric fisheye lenses with stereographic projection schemes.

On the other hand, reference 17 provides various examples of obtaining panoramic images following cylindrical projection schemes, equi-rectangular projection schemes, and Mercator projection schemes from images acquired using rotationally symmetric wide-angle lenses including fisheye lenses. Referring to FIG. 4 through FIG. 12, most of the examples provided in the said reference can be summarized as follows.

FIG. 4 is a conceptual drawing illustrating the real projection schemes of rotationally symmetric wide-angle lenses (412) including fisheye lenses. Z-axis of the world coordinate system describing objects captured by the wide-angle lens coincides with the optical axis (401) of the wide-angle lens (412). An incident ray (405) having a zenith angle θ with respect to the Z-axis is refracted by the lens (412), and as a refracted ray (406), converges toward an image point P on the focal plane (432). The distance between the nodal point N of the lens and the said focal plane is approximately equal to the effective focal length of the lens. The sub area on the focal plane whereon real image points have been formed is the image plane (433). To obtain a sharp image, the said image plane (433) must coincide with the image sensor plane (413) within the camera body (414). Said focal plane and the said image sensor plane are perpendicular to the optical axis. The intersection point O between the optical axis (401) and the image plane (433) is hereinafter referred to as the first intersection point. The distance between the first intersection point and the said image point P is r.

For general wide-angle lenses, the image height r is given by Eq. 9.

Math Figure 9

$$r = r(\theta) \quad [\text{Math.9}]$$

Here, the unit of the incidence angle θ is radian, and the above function r(θ) is a monotonically increasing function of the zenith angle θ of the incident ray.

Such a real projection scheme of a lens can be experimentally measured using an actual lens, or can be calculated from the lens prescription using dedicated lens design software such as Code V or Zemax. For example, the y-axis coordinate y of the image point on the focal plane by an incident ray having given horizontal and vertical incidence angles can be calculated using a Zemax operator REAY, and the x-axis coordinate x can be similarly calculated using an operator REAX.

FIG. 5 is an imaginary interior scene produced by professor Paul Bourke by using a computer, and it has been assumed that the imaginary lens used to capture the image is a fisheye lens with 180° FOV having an ideal equidistance projection scheme. This image is a square image, of which both the lateral and the longitudinal dimensions are 250 pixels. Therefore, the coordinate of the optical axis is (125.5, 125.5), and the image height for an incident ray with zenith angle 90° is given as r'(π/2)=125.5−1=124.5. Here, r' is not a physical distance, but an image height measured in pixel distance. Since this imaginary fisheye lens follows an equidistance projection scheme, the projection scheme of this lens is given by Eq. 10.

Math Figure 10

$$r'(\theta) = \frac{124.5}{\left(\frac{\pi}{2}\right)}\theta = 79.26\theta \quad [\text{Math. 10}]$$

FIG. 6 through FIG. 8 show several embodiments of wide-angle lenses presented in reference 16. FIG. 6 is a dioptric (i.e., refractive) fisheye lens with a stereographic projection scheme, FIG. 7 is a catadioptric fisheye lens with a stereographic projection scheme, and FIG. 8 is a catadioptric panoramic lens with a rectilinear projection scheme. In this manner, the wide-angle lenses from the said reference and in the current invention are not limited to a fisheye lens with an equidistance projection scheme, but encompass all kind of wide-angle lenses that are rotationally symmetric about the optical axes.

The main point of the invention in reference 17 is about methods of obtaining panoramic images by applying mathematically accurate image processing algorithms on images obtained using rotationally symmetric wide-angle lenses. Numerous embodiments in reference 17 can be summarized as follows.

The world coordinate system of the said invention takes the nodal point N of a rotationally symmetric wide-angle lens as the origin, and a vertical line passing through the origin as the Y-axis. Here, the vertical line is a line perpendicular to the ground plane, or more precisely to the horizontal plane (917). The X-axis and the Z-axis of the world coordinate system are contained within the ground plane. The optical axis (901) of the said wide-angle lens generally does not coincide with the Y-axis, and can be contained within the ground plane (i.e., parallel to the ground), or is not contained within the ground plane. The plane (904) containing both the said Y-axis and the said optical axis (901) is referred to as the reference plane. The intersection line (902) between this reference plane (904) and the ground plane (917) coincides with the Z-axis of the world coordinate system. On the other hand, an incident ray (905) originating from an object point Q having a rectangular coordinate (X, Y, Z) in the world coordinate system has an altitude angle δ from the ground plane, and an azimuth angle ψ with respect to the reference plane. The plane (906) containing both the Y-axis and the said incident ray (905) is the incidence plane. The horizontal incidence angle ψ of the said incident ray with respect to the said reference plane is given by Eq. 11.

Math Figure 11

$$\psi = \tan^{-1}\left(\frac{X}{Z}\right) \quad [\text{Math. 11}]$$

On the other hand, the vertical incidence angle (i.e., the altitude angle) δ subtended by the said incident ray and the X-Z plane is given by Eq. 12.

Math Figure 12

$$\delta = \tan^{-1}\left(\frac{Y}{\sqrt{X^2 + Z^2}}\right) \quad [\text{Math. 12}]$$

The elevation angle μ of the said incident ray is given by Eq. 13, wherein χ is an arbitrary angle larger than −90° and smaller than 90°.

Math Figure 13

$$\mu = \delta - \chi \quad [\text{Math.13}]$$

FIG. 10 is a schematic diagram of a device of the current invention, which also coincides with that of the reference 17, having an imaging system which mainly includes an image acquisition means (1010), an image processing means (1016) and image display means (1015, 1017). The image acquisition means (1010) includes a rotationally symmetric wide-angle lens (1012) and a camera body (1014) having an image sensor (1013) inside. The said wide-angle lens can be a fisheye lens with more than 180° FOV and having an equidistance projection scheme, but it is by no means limited to such a fisheye lens. Rather, it can be any rotationally symmetric wide-angle lens including a catadioptric fisheye lens. Hereinafter, for the sake of notational simplicity, a wide-angle lens is referred to as a fisheye lens. Said camera body contains photoelectronic sensors such as CCD or CMOS sensors, and it can acquire either a still image or a movie. By the said fisheye lens (1012), a real image of the object plane (1031) is formed on the focal plane (1032). In order to obtain a sharp image, the image sensor plane (1013) must coincide with the focal plane (1032).

The real image of the objects on the object plane (1031) formed by the fisheye lens (1012) is converted by the image sensor (1013) into electrical signals, and displayed as an uncorrected image plane (1034) on the image display means (1015). This uncorrected image plane (1034) contains a barrel distortion by the fisheye lens. This distorted image plane can be rectified by the image processing means (1016), and then displayed as a processed image plane (1035) on an image display means (1017) such as a computer monitor or a CCTV monitor. Said image processing can be software image processing by a computer, or hardware image processing by Field Programmable Gate Arrays (FPGA) or ARM core processors.

An arbitrary rotationally symmetric lens including a fisheye lens does not provide said panoramic image or a distortion-free rectilinear image. Therefore, image processing stage is essential in order to obtain a desirable image. FIG. 11 is a conceptual drawing of an uncorrected image plane (1134) prior to the image processing stage, which corresponds to the real image on the image sensor plane (1013). If the lateral dimension of the image sensor plane (1013) is B and the longitudinal dimension is V, then the lateral dimension of the uncorrected image plane is gB and the longitudinal dimension is gV, where g is proportionality constant.

Uncorrected image plane (1134) can be considered as the image displayed on the image display means without rectification of distortion, and is a magnified image of the real image on the image sensor plane by a magnification ratio g. For example, the image sensor plane of a ⅓-inch CCD sensor has a rectangular shape having a lateral dimension of 4.8 mm, and a longitudinal dimension of 3.6 mm. On the other hand, if the monitor is 48 cm in width and 36 cm in height, then the magnification ratio g is 100. More desirably, the side dimension of a pixel in a digital image is considered as 1. A VGA-grade ⅓-inch CCD sensor has pixels in an array form with 640 columns and 480 rows. Therefore, each pixel has a right rectangular shape with both width and height measuring as 4.8 mm/640=7.5 μm, and in this case, the magnification ratio g is given by 1 pixel/7.5 μm=133.3 pixel/mm. In recapitulation, the uncorrected image plane (1134) is a distorted digital image obtained by converting the real image formed on the image sensor plane into electrical signals.

The first intersection point O on the image sensor plane is the intersection point between the optical axis and the image sensor plane. Therefore, a ray entered along the optical axis forms an image point on the said first intersection point O. By definition, the point O' on the uncorrected image plane corresponding to the first intersection point O in the image sensor plane—hereinafter referred to as the second intersection point—corresponds to the image point by an incident ray entered along the optical axis.

A second rectangular coordinate systems is assumed wherein x'-axis is taken as the axis that passes through the second intersection point O' on the uncorrected image plane and is parallel to the lateral side of the uncorrected image plane, and y'-axis is taken as the axis that passes through the said second intersection point O' and is parallel to the longitudinal side of the uncorrected image plane. The positive direction of the x'-axis runs from the left to the right, and the positive direction of the y'-axis runs from the top to the bottom. Then, the lateral coordinate x' of an arbitrary point on the uncorrected image plane (1134) has a minimum value $x'_1 = gx_1$ and a maximum value $x'_2 = gx_2$ (i.e., $gx_1 \leq x' \leq gx_2$). In the same manner, the longitudinal coordinate y' of the said point has a minimum value $y'_1 = gy_1$ and a maximum value $y'_2 = gy_2$ (i.e., $gy_1 \leq y' \leq gy_2$).

FIG. 12 is a conceptual drawing of a rectified screen of the current invention, wherein the distortion has been removed. In other words, it is a conceptual drawing of a processed image plane (1235) that can be displayed on the image display means. The processed image plane (1235) has a rectangular shape, of which the lateral side measuring as W and the longitudinal side measuring as H. Furthermore, a third rectangular coordinate system is assumed wherein x"-axis is parallel to the lateral side of the processed image plane, and y"-axis is parallel to the longitudinal side of the processed image plane. The z"-axis of the third rectangular coordinate system coincides with the z-axis of the first rectangular coordinate system and the z'-axis of the second rectangular coordinate system. The intersection point O" between the said z"-axis and the processed image plane—hereinafter referred to as the third intersection point—can take an arbitrary position, and it can even be located outside the processed image plane. Here, the positive direction of the x"-axis runs from the left to the right, and the positive direction of the y"-axis runs from the top to the bottom.

The first and the second intersection points correspond to the location of the optical axis. On the other hand, the third intersection point corresponds not to the location of the optical axis but to the principal direction of vision. The principal direction of vision may coincide with the optical axis, but it is not needed to. Principal direction of vision is the direction of the optical axis of an imaginary panoramic or rectilinear camera corresponding to the desired panoramic or rectilinear images. Hereinafter, for the sake of notational simplicity, the principal direction of vision is referred to as the optical axis direction.

The lateral coordinate x" of a third point P" on the processed image plane (1235) has a minimum value $x"_1$ and a maximum value $x"_2$ (i.e., $x"_1 \leq x" \leq x"_2$). By definition, the difference between the maximum lateral coordinate and the minimum lateral coordinate is the lateral dimension of the processed image plane (i.e., $x''_2 - x''_1 = W$). In the same manner, the longitudinal coordinate $y''$ of the third point $P''$ has a minimum value $y''_1$ and a maximum value $y''_2$ (i.e., $y''_1 \le y'' \le y''_2$). By definition, the difference between the maximum longitudinal coordinate and the minimum longitudinal coordinate is the longitudinal dimension of the processed image plane (i.e., $y''_2 - y''_1 = H$).

The following table 1 summarizes corresponding variables in the object plane, the image sensor plane, the uncorrected image plane, and the processed image plane.

TABLE 1

|  | surface | | | |
| --- | --- | --- | --- | --- |
|  | object plane | image sensor plane | uncorrected image plane | processed image plane |
| lateral dimension of the plane |  | B | gB | W |
| longitudinal dimension of the plane |  | V | gV | H |
| coordinate system | world coordinate system | the first rectangular coordinate system | the second rectangular coordinate system | the third rectangular coordinate system |
| location of the coordinate origin | nodal point of the lens | nodal point of the lens | nodal point of the lens | nodal point of the lens |
| symbol of the origin |  | O | O' | O'' |
| coordinate axes | (X, Y, Z) | (x, y, z) | (x', y', z') | (x'', y'', z'') |
| name of the object point or the image points | object point | the first point | the second point | the third point |
| symbol of the object point or the image point | Q | P | P' | P'' |
| two dimensional coordinate of the object point or the image point |  | (x, y) | (x', y') | (x'', y'') |

On the other hand, if we assume the coordinate of an image point $P''$ on the processed image plane (1235) corresponding to an object point with a coordinate (X, Y, Z) in the world coordinate system is (x'', y''), then the said image processing means process the image so that the image point corresponding to an incident ray originating from the said object point appears on the said screen with the coordinate (x'', y''), wherein the lateral coordinate $x''$ of the image point is given by Eq. 14.

Math Figure 14

$$x'' = c\psi \qquad [\text{Math.14}]$$

Here, c is proportionality constant.

Furthermore, the longitudinal coordinate $y''$ of the said image point is given by Eq. 15.

Math Figure 15

$$y'' = cF(\mu) \qquad [\text{Math.15}]$$

Here, $F(\mu)$ is a monotonically increasing function passing through the origin. In mathematical terminology, it means that Eqs. 16 and 17 are satisfied.

Math Figure 16

$$F(0) = 0 \qquad [\text{Math. 16}]$$

Math Figure 17

$$\frac{\partial F(\mu)}{\partial \mu} > 0 \qquad [\text{Math. 17}]$$

The above function F can take an arbitrary form, but the most desirable forms are given by Eqs. 18 through 21.

Math Figure 18

$$F(\mu) = \tan\mu \qquad [\text{Math. 18}]$$

Math Figure 19

$$F(\mu) = \frac{\tan\mu}{\cos\chi} \qquad [\text{Math. 19}]$$

Math Figure 20

$$F(\mu) = \mu \qquad [\text{Math. 20}]$$

Math Figure 21

$$F(\mu) = \ln\{\tan(\frac{\mu}{2} + \frac{\pi}{4})\} \qquad [\text{Math. 21}]$$

FIG. 13 is a schematic diagram of an ordinary car rear view camera (1310). For a car rear view camera, it is rather common that a wide-angle lens with more than 150° FOV is used, and the optical axis of the lens is typically inclined toward the ground plane (1317) as illustrated in FIG. 13. By installing the camera in this way, parking lane can be easily recognized when backing up the car. Furthermore, since the lens surface is oriented downward toward the ground, precipitation of dust is prevented, and partial protection is provided from rain and snow.

To obtain a panoramic image with a horizontal FOV around 180°, it is desirable to install the image acquisition means (1310) on top of the trunk of a passenger car, and to align the optical axis at a certain angle with the ground plane. Furthermore, a fisheye lens with more than 180° FOV and having an equidistance projection scheme is most preferable, and the image display means is desirably installed next to the driver seat.

It is possible to obtain said panoramic image using a wide-angle camera with its optical axis inclined toward the ground plane. In this case, the world coordinate system takes the nodal point N of the imaging system (1310) as the origin, and takes a vertical line that is perpendicular to the ground plane as the Y-axis, and the Z-axis is set parallel to the car (1351) axle. According to the convention of right handed coordinate system, the positive direction of the X-axis is the direction directly plunging into the paper in FIG. 13. Therefore, if the lens optical axis is inclined below the horizon with an angle α, then a coordinate system fixed to the camera has been rotated around the X-axis of the world coordinate system by angle α. This coordinate system is referred to as the first world coordinate system, and the three axes of this first world coordinate system are named as X', Y' and Z'-axis, respectively. In FIG. 13, it appears that the first world coordinate system has been rotated around the X-axis clockwise by angle α relative to the world coordinate system. However, considering the direction of the positive X-axis, it has been in fact rotated counterclockwise by angle α. Since direction of rotation considers counterclockwise rotation as the positive direction, the first world coordinate system in FIG. 13 has been rotated by +α around the X-axis of the world coordinate system.

Regarding the rotation of coordinate system, it is convenient to use the Euler matrices. For this, the coordinate of an object point Q in three dimensional space is designated as a three dimensional vector as given below.

Math Figure 22

$$\vec{Q} = \begin{pmatrix} X \\ Y \\ Z \end{pmatrix} \quad [\text{Math. 22}]$$

Here, $\vec{Q}$ is the three dimensional vector in the world coordinate system starting at the origin and ending at the point Q. Then, the coordinate of a new point obtainable by rotating the point Q in the space by an angle of −α around the X-axis is given by multiplying the matrix given in Eq. 23 on the above vector.

Math Figure 23

$$M_X(\alpha) = \begin{pmatrix} 1 & 0 & 0 \\ 0 & \cos\alpha & \sin\alpha \\ 0 & -\sin\alpha & \cos\alpha \end{pmatrix} \quad [\text{Math. 23}]$$

Likewise, the matrix given in Eq. 24 can be used to find the coordinate of a new point which is obtainable by rotating the point Q by angle −β around the Y-axis, and the matrix given in Eq. 25 can be used to find the coordinate of a new point which is obtainable by rotating the point Q by angle −γ around the Z-axis.

Math Figure 24

$$M_Y(\beta) = \begin{pmatrix} \cos\beta & 0 & -\sin\beta \\ 0 & 1 & 0 \\ \sin\beta & 0 & \cos\beta \end{pmatrix} \quad [\text{Math. 24}]$$

Math Figure 25

$$M_Z(\gamma) = \begin{pmatrix} \cos\gamma & \sin\gamma & 0 \\ -\sin\gamma & \cos\gamma & 0 \\ 0 & 0 & 1 \end{pmatrix} \quad [\text{Math. 25}]$$

Matrices in Eqs. 23 through 25 can describe the case where the coordinate system is fixed and the point in space has been rotated, but also the same matrices can describe the case where the point in space is fixed and the coordinate system has been rotated in the reverse direction. These two cases are mathematically equivalent. Therefore, the coordinate of a point Q in the first world coordinate system which is obtained by rotating the world coordinate system by angle α around the X-axis as indicated in FIG. 13 is given by Eq. 26.

Math Figure 26

$$\vec{Q}' = \begin{pmatrix} X' \\ Y' \\ Z' \end{pmatrix} = M_X(\alpha) \begin{pmatrix} X \\ Y \\ Z \end{pmatrix} \quad [\text{Math. 26}]$$

Using the matrix given in Eq. 23, the coordinate in the first world coordinate system can be given as follows in terms of the coordinate in the world coordinate system.

Math Figure 27

$$X' = X \quad [\text{Math.27}]$$

Math Figure 28

$$Y' = Y\cos\alpha + Z\sin\alpha \quad [\text{Math.28}]$$

Math Figure 29

$$Z' = -Y\sin\alpha + Z\cos\alpha \quad [\text{Math.29}]$$

Referring to FIG. 13, let's assume that an imaging system has been installed with its optical axis inclined toward the ground plane, and nevertheless, it is desired to obtain a panoramic image that is parallel to the ground plane. If we assume that FIG. 5 is a wide-angle image with α=0°, then FIG. 14 is a wide-angle image with α=30°. In this case, the following algorithm can be used to obtain a panoramic image that is parallel to the ground plane. First, under the assumption that the said imaging system is parallel to the ground plane, the size (W, H) of the processed image plane, the location of the third intersection point O", and the horizontal field of view Δψ are determined. For simplicity of argument, the horizontal FOV is assumed as symmetric. Then, the horizontal incidence angle ψ corresponding to the lateral coordinate x" on the processed image plane and the vertical incidence angle δ corresponding to the longitudinal coordinate y" are given by Eqs. 30 through 32.

Math Figure 30

$$A = \frac{W}{\Delta\psi} \quad \text{[Math. 30]}$$

Math Figure 31

$$\psi = \frac{x''}{A} \quad \text{[Math. 31]}$$

Math Figure 32

$$\delta = F^{-1}\left(\frac{y''}{A}\right) \quad \text{[Math. 32]}$$

Here, the angle $\chi$ is 0°. Therefore, the function $F(\delta)$ is identical to the function $F(\mu)$ given in Eqs. 16 through 21. In other words, it is true that $F(\delta)=F(\mu)$. Next, it is assumed that an incident ray having these horizontal and vertical incidence angles has been originated from an object point on a hemisphere with a radius S having its center at the nodal point of the lens. Then, the coordinate of the said object point in the world coordinate system is given by Eqs. 33 through 36.

Math Figure 33

$$X = S \cos\delta \sin\psi \quad \text{[Math. 33]}$$

Math Figure 34

$$Y = S \sin\delta \quad \text{[Math. 34]}$$

Math Figure 35

$$Z = S \cos\delta \cos\psi \quad \text{[Math. 35]}$$

Math Figure 36

$$S = \sqrt{X^2 + Y^2 + Z^2} \quad \text{[Math. 36]}$$

The coordinate of this object point in the first world coordinate system is given by Eqs. 27 through 29. The X', Y' and Z'-axes of this first world coordinate system are parallel to the x, y, and z-axes of the first rectangular coordinate system, respectively. Therefore, the zenith and the azimuth angles of the incident ray are given by Eqs. 37 and 38.

Math Figure 37

$$\theta = \cos^{-1}\left(\frac{Z'}{S}\right) \quad \text{[Math. 37]}$$

Math Figure 38

$$\phi = \tan^{-1}\left(\frac{Y'}{X'}\right) \quad \text{[Math. 38]}$$

Finally, two dimensional rectangular coordinate (x', y') of the second point in the uncorrected image plane having these zenith and azimuth angles can be obtained from the two dimensional polar coordinate by Eqs. 39 and 40.

Math Figure 39

$$x' = gr(\theta)\cos\phi \quad \text{[Math. 39]}$$

Math Figure 40

$$y' = gr(\theta)\sin\phi \quad \text{[Math. 40]}$$

Using Eqs. 9 through 40, a panoramic image having an ideal projection scheme can be extracted from an image acquired using a fisheye lens exhibiting the distortion aberration. First, depending on the user's need, a desirable size (W, H) of the panoramic image, and the location of the third intersection point O" are determined. The said third intersection point can be located even outside the processed image plane. In other words, the range of the lateral coordinate $(x''_1 \leq x'' \leq x''_2)$ on the processed image plane as well as the range of the longitudinal coordinate $(y''_1 \leq y'' \leq y''_2)$ can take arbitrary real numbers. Also, the horizontal FOV $\Delta\psi$ of this panoramic image (i.e., the processed image plane) is determined. The functional form of $F(\delta)$ dictating the desirable projection scheme along the vertical direction is determined, as well. Then, the horizontal incidence angle $\psi$ and the vertical incidence angle $\delta$ of an incident ray corresponding to the third point on the panoramic image having a rectangular coordinate (x", y") can be obtained using Eqs. 30 through 32. Then, the zenith angle $\theta$ and the azimuth angle $\phi$ of an incident ray having the said horizontal incidence angle and the vertical incidence angle are calculated using Eqs. 37 and 38. Next, the real image height r corresponding to the zenith angle $\theta$ of the incident ray is obtained using Eq. 9. Utilizing the real image height r, the magnification ratio g, and the azimuth angle $\phi$ of the incident ray, the rectangular coordinate (x', y') of the image point on the uncorrected image plane is obtained using Eqs. 39 and 40. In this procedure, the coordinate of the second intersection point on the uncorrected image plane, or equivalently the first intersection point on the image sensor plane, has to be accurately determined. Such a location of the intersection point can be easily found using various methods including image processing method. Since such technique is well known to the people in this field, it will not be described in this document. Finally, the video signal (i.e., RGB signal) by the fisheye lens from the image point having said rectangular coordinate is given as the video signal for the image point on the panoramic image having the rectangular coordinate (x", y"). A panoramic image having an ideal projection scheme can be obtained by image processing for all the image points on the processed image plane by the above-described method.

Considering the fact that all the image sensors and display devices are digital devices, image processing procedure must use the following set of equations. First, a desirable size of the processed image plane and the location $(I_o, J_o)$ of the third intersection point are determined. Here, the location $(I_o, J_o)$ of the third intersection point refers to the pixel coordinate of the third intersection point O". Conventionally, the coordinate of a pixel on the upper left corner of a digitized image is defined as (1, 1) or (0, 0). In the current invention, we will assume that the coordinate of the pixel on the upper left corner is given as (1, 1). Then, the horizontal incidence angle $\psi_1$ corresponding to the lateral pixel coordinate of J=1 and the horizontal incidence angle $\psi_{Jmax}$ corresponding to the lateral pixel coordinate of $J=J_{max}$ are determined. Then, for every pixel (I, J) on the processed image plane, the horizontal incidence angle $\psi_J$ and the vertical incidence angle $\delta_I$ are calculated using Eqs. 41 and 42.

Math Figure 41

$$\psi_J = \frac{\psi_{Jmax} - \psi_1}{J_{max} - 1}(J - J_o) \quad \text{[Math. 41]}$$

Math Figure 42

$$\delta_I = F^{-1}\left\{\frac{\psi_{Jmax} - \psi_1}{J_{max} - 1}(I - I_o)\right\} \quad \text{[Math. 42]}$$

From the above horizontal and vertical incidence angles, the coordinate of an imaginary object point in the world coordinate system is calculated using Eqs. 43 through 45.

Math Figure 43

$$X_{I,J} = \cos \delta_I \sin \psi_J \quad [\text{Math.43}]$$

Math Figure 44

$$Y_{I,J} = \sin \delta_I \quad [\text{Math.44}]$$

Math Figure 45

$$Z_{I,J} = \cos \delta_I \cos \psi_J \quad [\text{Math.45}]$$

Here, the object distance S does not affect the final outcome and thus it is assumed as 1 for the sake of simplicity. From this coordinate of the object point in the world coordinate system, the coordinate of the object point in the first world coordinate system is calculated from Eqs. 46 through 48.

Math Figure 46

$$X'_{I,J} = X_{I,J} \quad [\text{Math.46}]$$

Math Figure 47

$$Y'_{I,J} = Y_{I,J} \cos \alpha + Z_{I,J} \sin \alpha \quad [\text{Math.47}]$$

Math Figure 48

$$Z'_{I,J} = -Y_{I,J} \sin \alpha + Z_{I,J} \cos \alpha \quad [\text{Math.48}]$$

From this coordinate, the zenith angle $\theta_{I,J}$ and the azimuth angle $\Phi_{I,J}$ of the incident ray are calculated using Eqs. 49 and 50.

Math Figure 49

$$\theta_{I,J} = \cos^{-1}(Z'_{I,J}) \quad [\text{Math. 49}]$$

Math Figure 50

$$\phi_{I,J} = \tan^{-1}\left(\frac{Y'_{I,J}}{X'_{I,J}}\right) \quad [\text{Math. 50}]$$

Next, the image height $r_{I,J}$ on the image sensor plane is calculated using Eq. 51.

Math Figure 51

$$r_{I,J} = r(\theta_{I,J}) \quad [\text{Math.51}]$$

Then, the position $(K_o, L_o)$ of the second intersection point on the uncorrected image plane and the magnification ratio g are used to find the position of the second point on the uncorrected image plane.

Math Figure 52

$$x'_{I,J} = L_o + g r_{I,J} \cos(\phi_{I,J}) \quad [\text{Math.52}]$$

Math Figure 53

$$y'_{I,J} = K_o + g r_{I,J} \sin(\phi_{I,J}) \quad [\text{Math.53}]$$

Once the position of the corresponding second point has been found, diverse interpolation methods such as the nearest-neighbor method, the bilinear interpolation method, and the bicubic interpolation method can be used to obtain a panoramic image.

FIG. 15 is a panoramic image obtained using this method, and a cylindrical projection scheme has been employed. As can be seen from FIG. 15, a perfect panoramic image has been obtained despite the fact that the optical axis is not parallel to the ground plane. Using such a panoramic imaging system as a car rear view camera, the backside of a vehicle can be entirely monitored without any dead spot.

One point which needs special attention when using such an imaging system as a car rear view camera is the fact that for a device (i.e., a car) of which the moving direction is the exact opposite of the optical axis direction of the image acquisition means, it can cause a great confusion to the driver if a panoramic image obtained by above described method is displayed without any further processing. Since the car rear view camera is heading toward the backside of the car, the right end of the car appears as the left end on the monitor showing the images captured by the rear view camera. However, the driver can fool himself by thinking that the image is showing the left end of the car from his own viewpoint of looking at the front end of the car, and thus, there is a great danger of possible accidents. To prevent such a perilous confusion, it is important to switch the left and the right sides of the image obtained using a car rear view camera before displaying it on the monitor. The video signal S'(I, J) for the pixel in a mirrored (i.e., the left and the right sides are exchanged) processed image plane with a coordinate (I, J) is given by the video signal $S(I, J_{max}-J+1)$ from the pixel in the processed image plane with coordinate $(I, J_{max}-J+1)$.

Math Figure 54

$$S'(I,J) = S(I, J_{max}-J+1) \quad [\text{Math.54}]$$

Identical image acquisition means can be installed near the room mirror, frontal bumper, or the radiator grill in order to be used as a recording camera connected to a car black box for the purpose of recording vehicle's driving history.

Above embodiment has been described in relation to a car rear view camera, but it must be obvious that the usefulness of the invention described in this embodiment is not limited to a car rear view camera.

Said invention in reference 17 provides image processing algorithms for extracting mathematically accurate panoramic images and devices implementing the algorithms. In many cases, however, distortion-free rectilinear image can be of more value. Or, it can be more satisfactory when panoramic images and rectilinear images are both available.

[reference 1] J. F. Blinn and M. E. Newell, "Texture and reflection in computer generated images", Communications of the ACM, 19, 542-547 (1976).

[reference 2] N. Greene, "Environment mapping and other applications of world projections", IEEE Computer Graphics and Applications, 6, 21-29 (1986).

[reference 3] S. D. Zimmermann, "Omniview motionless camera orientation system", U.S. Pat. No. 5,185,667, date of patent Feb. 9, 1993.

[reference 4] E. Gullichsen and S. Wyshynski, "Wide-angle image dewarping method and apparatus", U.S. Pat. No. 6,005,611, date of patent Dec. 21, 1999.

[reference 5] E. W. Weisstein, "Cylindrical Projection", http://mathworld.wolfram.com/CylindricalProjection.html.

[reference 6] W. D. G. Cox, "An introduction to the theory of perspective—part 1", The British Journal of Photography, 4, 628-634 (1969).

[reference 7] G. Kweon, K. Kim, Y. Choi, G. Kim, and S. Yang, "Catadioptric panoramic lens with a rectilinear projection scheme", Journal of the Korean Physical Society, 48, 554-563 (2006).

[reference 8] G. Kweon, Y. Choi, G. Kim, and S. Yang, "Extraction of perspectively normal images from video sequences obtained using a catadioptric panoramic lens with the rectilinear projection scheme", Technical Proceedings of the 10th World Multi-Conference on Systemics, Cybernetics, and Informatics, 67-75 (Orlando, Fla., USA, June, 2006).

[reference 9] H. L. Martin and D. P. Kuban, "System for omnidirectional image viewing at a remote location without the transmission of control signals to select viewing parameters", U.S. Pat. No. 5,384,588, date of patent Jan. 24, 1995.

[reference 10] F. Oxaal, "Method and apparatus for performing perspective transformation on visible stimuli", U.S. Pat. No. 5,684,937, date of patent Nov. 4, 1997.

[reference 11] F. Oxaal, "Method for generating and interactively viewing spherical image data", U.S. Pat. No. 6,271,853, date of patent Aug. 7, 2001.

[reference 12] N. L. Max, "Computer graphics distortion for IMAX and OMNIMAX projection", Proc. NICOGRAPH, 137-159 (1983).

[reference 13] P. D. Bourke, "Synthetic stereoscopic panoramic images", Lecture Notes in Computer Graphics (LNCS), Springer, 4270, 147-155 (2006).

[reference 14] G. Kweon and M. Laikin, "Fisheye lens", Korean patent 10-0888922, date of patent Mar. 10, 2009.

[reference 15] G. Kweon, Y. Choi, and M. Laikin, "Fisheye lens for image processing applications", J. of the Optical Society of Korea, 12, 79-87 (2008).

[reference 16] G. Kweon and M. Laikin, "Wide-angle lenses", Korean patent 10-0826571, date of patent Apr. 24, 2008.

[reference 17] G. Kweon, "Methods of obtaining panoramic images using rotationally symmetric wide-angle lenses and devices thereof", Korean patent 10-0882011, date of patent Jan. 29, 2009.

[reference 18] W. K. Pratt, Digital Image Processing, 3rd edition (John Wiley, New York, 2001), Chap. 19.

DISCLOSURE OF INVENTION

Technical Problem

The purpose of the present invention is to provide image processing algorithms for extracting natural looking panoramic images and rectilinear images from digitized images acquired using a camera equipped with a wide-angle lens which is rotationally symmetric about an optical axis and devices implementing such algorithms.

Technical Solution

The present invention provides image processing algorithms that are accurate in principle based on the geometrical optics principle regarding image formation by wide-angle lenses with distortion and mathematical definitions of panoramic and rectilinear images.

Advantageous Effects

By applying accurate image processing algorithms on images obtained using a rotationally symmetric wide-angle lens, panoramic images that appear most natural to the naked eye as well as rectilinear images can be obtained.

MODE FOR THE INVENTION

Referring to FIG. 16 through FIG. 60, the preferable embodiments of the present invention will be described in detail.

First Embodiment

Figure 16:
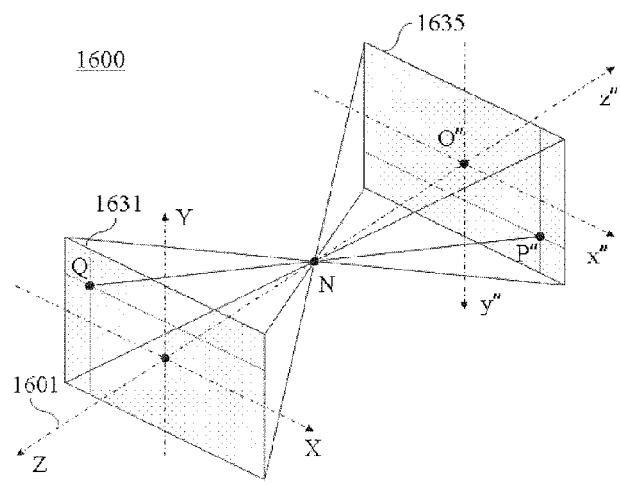
FIG. 16 is a conceptual drawing illustrating the rectilinear projection scheme of the first embodiment of the present invention.

FIG. 16 is a conceptual drawing illustrating the rectilinear projection scheme of the first embodiment of the present invention. By definition, a lens with a rectilinear projection scheme is a distortion-free lens, and in mathematical viewpoint, the characteristics of a rectilinear lens are considered identical to those of a pinhole camera. To acquire such an image with a rectilinear projection scheme, we assume an object plane (1631) and a processed image plane (1635) in the world coordinate system as shown in FIG. 16.

The imaging system of the present embodiment is heading in an arbitrary direction, and the third rectangular coordinate system takes the optical axis (1601) of the imaging system as the negative z"-axis, and the nodal point of the lens as the origin. Image sensor plane has a rectangular shape with a lateral width B and a longitudinal height V, and the image sensor plane is a plane perpendicular to the optical axis. On the other hand, the processed image plane has a rectangular shape with a lateral width W and a longitudinal height H. The x-axis of the first rectangular coordinate system, the x'-axis of the second rectangular coordinate system, the x"-axis of the third rectangular coordinate system and the X-axis of the world coordinate system are all parallel to the lateral side of the image sensor plane. Furthermore, the z-axis of the first rectangular coordinate system, the z'-axis of the second rectangular coordinate system, and the z"-axis of the third rectangular coordinate systems are all identical to each other and opposite to the Z-axis of the world coordinate system.

In the present embodiment, the processed image plane is assumed to be located at a distance s" from the nodal point of the lens. In a rectilinear projection scheme, the shape of the object plane (1631) is also a plane perpendicular to the optical axis, and the image of objects on the object plane is faithfully reproduced on the processed image plane (1635) with both the lateral and the longitudinal scales preserved. The ideal projection scheme of a rectilinear lens is identical to the projection scheme of a pinhole camera. Considering the simple geometrical characteristics of a pinhole camera, it is convenient to assume that the shape and the size of the object plane (1631) are identical to those of the processed image plane. Therefore, the distance from the object plane (1631) to the nodal point N of the lens is also assumed as s".

Figure 17:
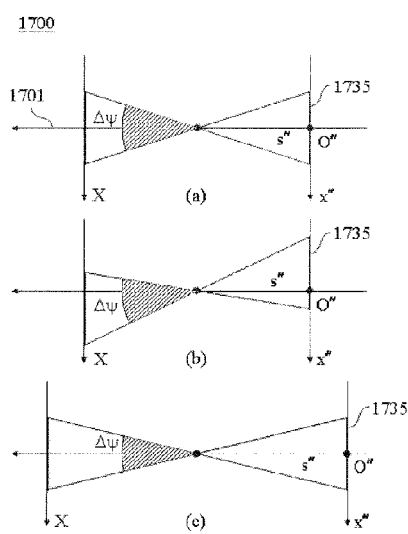
FIG. 17 is a conceptual drawing illustrating the change in field of view as the relative position of the processed image plane is changed.

FIG. 17 is a conceptual drawing illustrating how the horizontal field of view $\Delta\psi$ of a lens is changed by the relative position of the processed image plane (1735). In FIG. 17(a), the position of the processed image plane is symmetric with respect to the optical axis. Therefore, the image displayed on the processed image plane has a symmetrical horizontal field of view. On the other hand, in FIG. 17(b), the processed image plane (1735) has been laterally displaced with respect to the optical axis, and the FOVs are different for the left and the right sides. Such an operation is useful when it is desired to change the monitored area without changing the principal direction of vision. Physically, it corresponds to laterally displacing the image sensor with respect to the optical axis. In the present invention, such an operation will be referred to as a slide operation.

On the other hand, FIG. 17(c) shows the case where the distance s" between the nodal point and the processed image plane has been increased. In this case, as illustrated in the figure, the field of view becomes narrower, and only a small region is monitored. Physically, this corresponds to a zoom operation. Therefore, by changing the relative position of the processed image plane with respect to the optical axis, and the distance to the nodal point, slide and zoom effects can be achieved.

Figure 18:
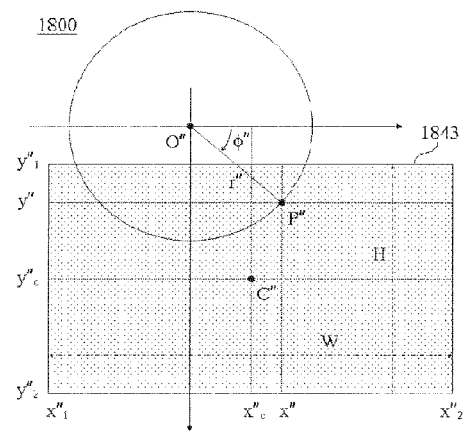
FIG. 18 is the conceptual drawing of a processed image plane according to the first embodiment of the present invention.

FIG. 18 illustrates the case where the intersection point O between the image sensor plane and the optical axis, or equivalently the third intersection point O' on the processed image plane corresponding to the first intersection point O does not coincide with the center C" of the processed image plane. Therefore, it corresponds to an imaging system with slide operation. In two-dimensional rectangular coordinate system having the third intersection point as the origin, the coordinate of the said center C" is given as ($x''_c$, $y''_c$). Since the lateral dimension of the processed image plane is W, the lateral coordinate with respect to the center C" has a minimum value $x''_1 = -W/2$ and a maximum value $x''_2 = W/2$. Considering the coordinate of the center C" on top of this, the range of the lateral coordinate of the processed image plane has a minimum value $x''_1 = x''_c - W/2$ and a maximum value $x''_2 = x''_c + W/2$. Likewise, the range of the longitudinal coordinate has a minimum value $y''_1 = y''_c - H/2$ and a maximum value $y''_2 = y''_c + H/2$.

The distance between the third intersection point O" on the processed image plane to the third point P", or the image height r" is given by Eq. 55.

Figure 55:
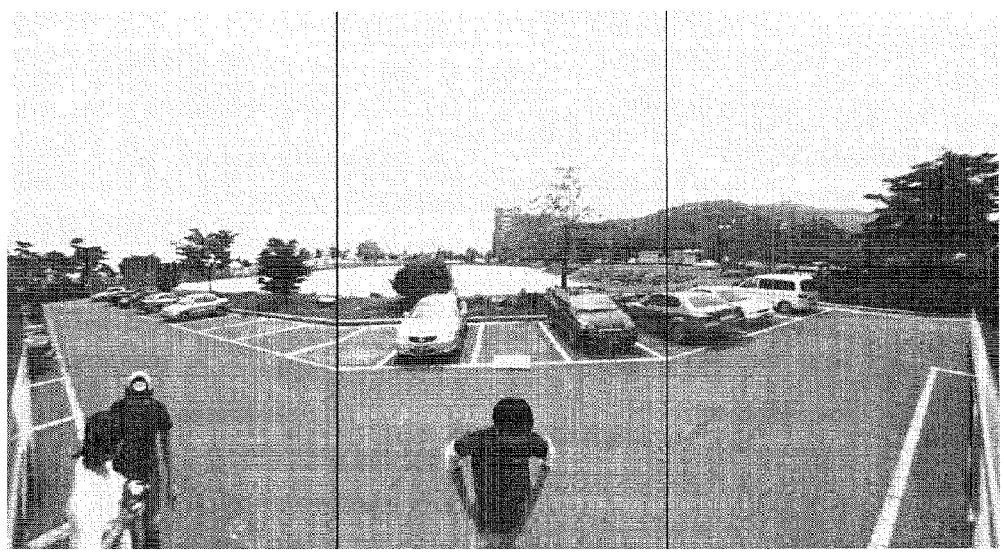
FIG. 55 is an exemplary multiple viewpoint panoramic image extracted from the fisheye image given in FIG. 37.

Math Figure 55

$$r'' = \sqrt{(x'')^2 + (y'')^2} \qquad [\text{Math.55}]$$

Since the virtual distance between the nodal point of the lens to the processed image plane is s", an incident ray arriving at the third point by the rectilinear lens has a zenith angle given by Eq. 56.

Figure 56:
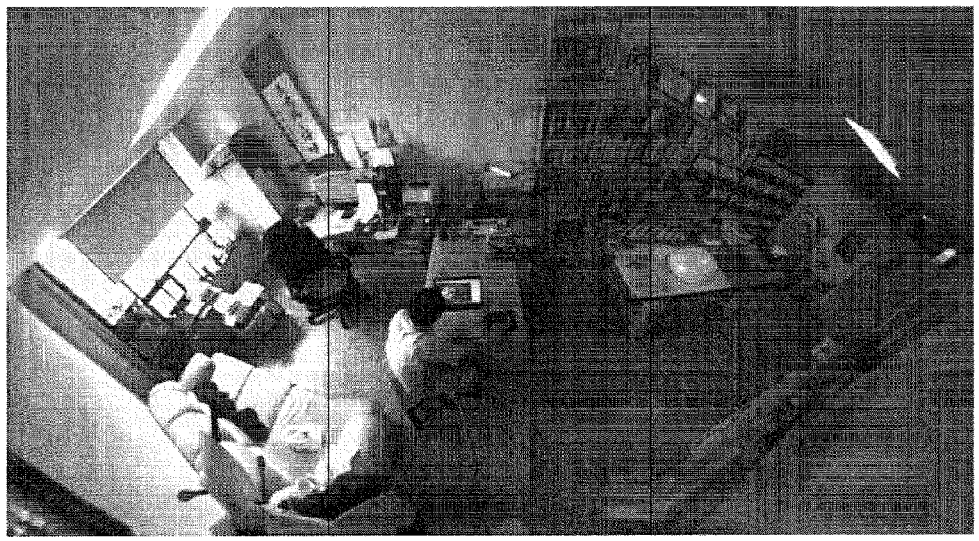
FIG. 56 is an exemplary multiple viewpoint panoramic image extracted from the fisheye image given in FIG. 27.

Math Figure 56

$$\theta = \tan^{-1}\left(\frac{r''}{s''}\right) \qquad [\text{Math. 56}]$$

On the other hand, the azimuth angle of the said incident ray is given by Eq. 57.

Figure 57:
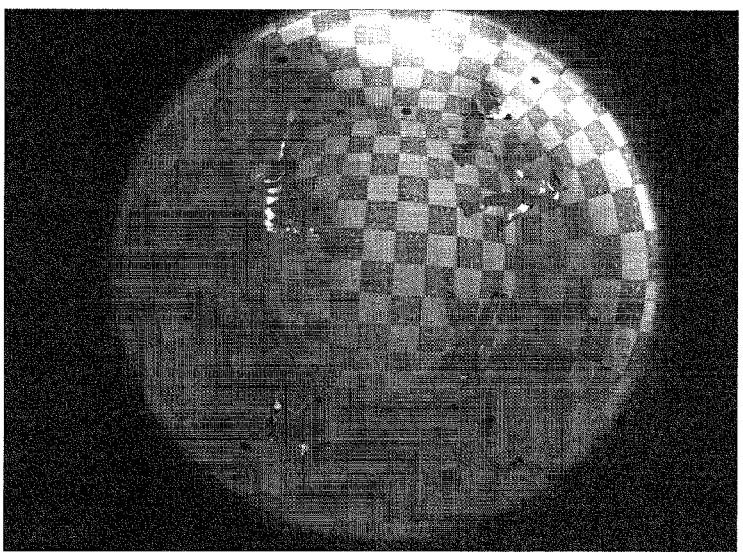
FIG. 57 is another exemplary image of an interior scene captured using a fisheye lens of the invention of a prior art.

Math Figure 57

$$\phi = \phi'' = \tan^{-1}\left(\frac{y''}{x''}\right) \qquad [\text{Math. 57}]$$

Therefore, when an incident ray having the said zenith angle and the said azimuth angle forms an image point on the image sensor plane by the image forming properties of the lens, the coordinate of the image point is given by Eqs. 58 and 59.

Figure 58:
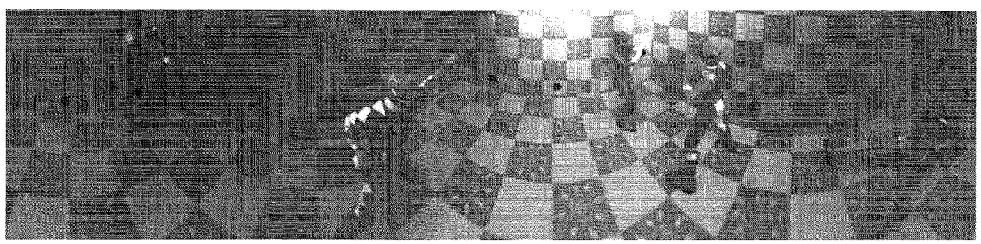
FIG. 58 is an exemplary panoramic image extracted from the fisheye image given in FIG. 57.

Math Figure 58

$$x' = gr(\theta)\cos\phi \qquad [\text{Math.58}]$$

Figure 59:
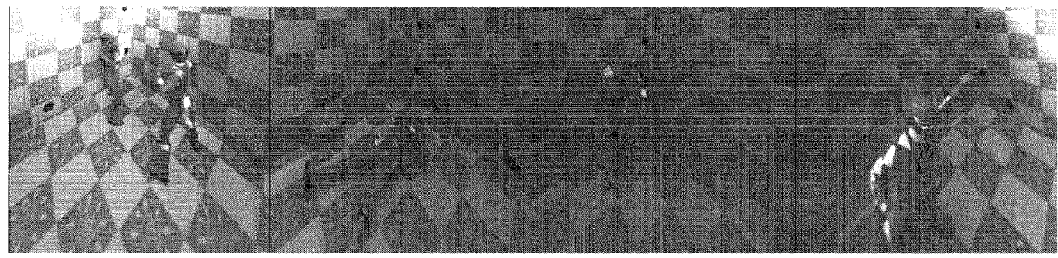
FIG. 59 is an exemplary multiple viewpoint panoramic image extracted from the fisheye image given in FIG. 57.

Math Figure 59

$$y' = gr(\theta)\sin\phi \qquad [\text{Math.59}]$$

Therefore, it is only necessary to substitute the signal value of the third point on the processed image plane by the signal value of the image point on the uncorrected image plane having such a rectangular coordinate.

In absence of a slide action, in other words, when the position of the third intersection point coincides with the center of the processed image plane, the following equation given in Eq. 60 is satisfied.

Figure 60:
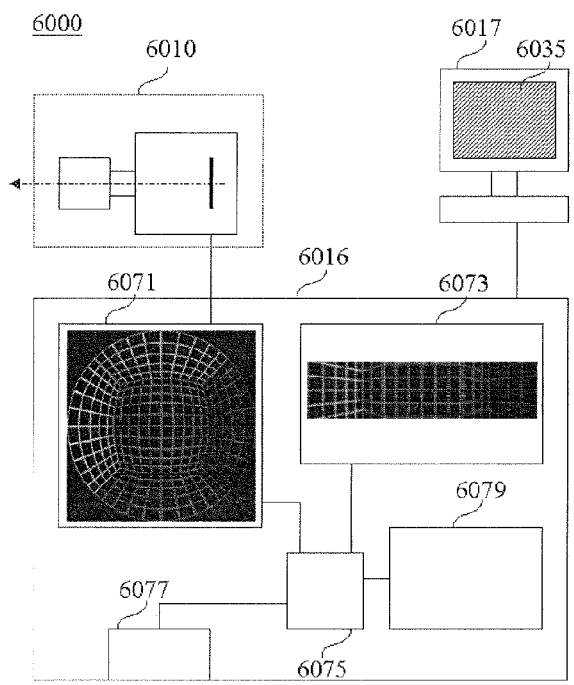
FIG. 60 is a schematic diagram of a desirable embodiment of the image processing means of the present invention.

Math Figure 60

$$s'' = \frac{\frac{W}{2}}{\tan\left(\frac{\Delta\psi}{2}\right)} = \frac{\frac{H}{2}}{\tan\left(\frac{\Delta\delta}{2}\right)} \qquad [\text{Math. 60}]$$

Using Eq. 60, the virtual distance s" of the processed image plane having given horizontal or vertical FOVs can be calculated. Purely for the purpose of convenience, the size (W, H) of the processed image plane and the horizontal FOV $\Delta\psi$ is first determined. Then, the virtual distance of the processed image plane is obtained, and from this distance, the symmetrical vertical FOV $\Delta\delta$ is automatically determined. On the other hand, if the coordinate of the center of the processed image plane is given by ($x''_c$, $y''_c$) as a result of a slide operation, then the following Eqs. 61 and 62 are satisfied.

Math Figure 61

$$s'' = \frac{x''}{\tan\psi} \qquad [\text{Math. 61}]$$

$$= \frac{x''_c - \frac{W}{2}}{\tan\psi_{min}}$$

$$= \frac{x''_c + \frac{W}{2}}{\tan\psi_{max}}$$

$$= \frac{W}{\tan\psi_{max} - \tan\psi_{min}}$$

Math Figure 62

$$s'' = \frac{y''}{\tan\delta} \qquad [\text{Math. 62}]$$

$$= \frac{y''_c - \frac{H}{2}}{\tan\delta_{min}}$$

$$= \frac{y''_c + \frac{H}{2}}{\tan\delta_{max}}$$

$$= \frac{H}{\tan\delta_{max} - \tan\delta_{min}}$$

Here, $\psi_{max}$ and $\psi_{min}$ are the maximum and the minimum incidence angles in the horizontal direction, and likewise, $\delta_{max}$ and $\delta_{min}$ are the maximum and the minimum incidence angles in the vertical direction. Furthermore, irrespective of the position of the center, the following relation given in Eq. 63 must be satisfied all the time.

Math Figure 63

$$\frac{W}{\tan\psi_{max} - \tan\psi_{min}} = \frac{H}{\tan\delta_{max} - \tan\delta_{min}} \quad [\text{Math. 63}]$$

Similar to the said embodiment of the invention of a prior art, considering the facts that all the image sensors and the display devices are digital devices, it is convenient to use the following equations in image processing procedure. First of all, the size ($I_{max}$, $J_{max}$) of the processed image plane and the horizontal FOV $\Delta\psi$ prior to any slide operation are determined. Then, the pixel distance s″ between the nodal point of the lens and the processed image plane can be obtained using Eq. 64.

Math Figure 64

$$s'' = \frac{J_{max} - 1}{2\tan\left(\frac{\Delta\psi}{2}\right)} \quad [\text{Math. 64}]$$

Furthermore, the coordinate of the center of the processed image plane is given by Eq. 65.

Math Figure 65

$$(I_o, J_o) = \left(\frac{1+I_{max}}{2}, \frac{1+J_{max}}{2}\right) \quad [\text{Math. 65}]$$

Here, Eq. (65) reflects the convention that the coordinate of the pixel on the upper left corner of a digital image is given as (1, 1).

Next, according to the needs, the displacement ($\Delta I$, $\Delta J$) of the said center from the third intersection point is determined. Once such preparatory stage has been finished, the zenith angle given in Eq. 66 and the azimuth angle given in Eq. 67 are calculated for every pixel on the processed image plane.

Math Figure 66

$$\theta_{I,J} = \tan^{-1}\left\{\frac{\sqrt{(I-I_o+\Delta I)^2 + (J-J_o+\Delta J)^2}}{s''}\right\} \quad [\text{Math. 66}]$$

Math Figure 67

$$\phi_{I,J} = \tan^{-1}\left(\frac{I-I_o+\Delta I}{J-J_o+\Delta J}\right) \quad [\text{Math. 67}]$$

Next, the image height $r_{I,J}$ on the image sensor plane is calculated using Eq. 68.

Math Figure 68

$$r_{I,J} = r(\theta_{I,J}) \quad [\text{Math.68}]$$

Next, the position of the second point on the uncorrected image plane is calculated using the position of the second intersection point on the uncorrected image plane and the magnification ratio g.

Math Figure 69

$$x'_{I,J} = L_o + gr_{I,J}\cos(\phi_{I,J}) \quad [\text{Math.69}]$$

Math Figure 70

$$y'_{I,J} = K_o + gr_{I,J}\sin(\phi_{I,J}) \quad [\text{Math.70}]$$

Once the position of the corresponding second point has been found, the rectilinear image can be obtained using the previously described interpolation methods.

Figure 1:
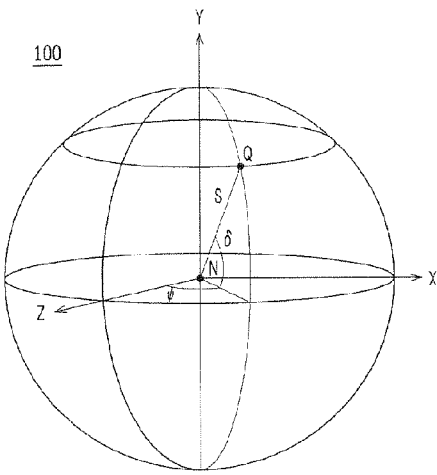
FIG. 1 is a conceptual drawing of the latitude and the longitude.
Figure 2:
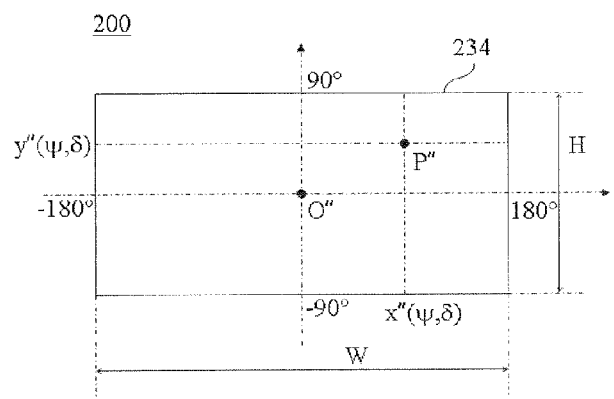
FIG. 2 is a conceptual drawing of a map with an equirectangular projection scheme.
Figure 3:
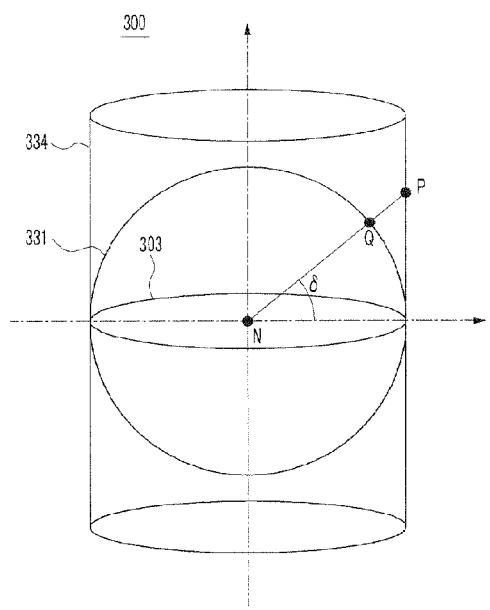
FIG. 3 is a conceptual drawing illustrating a cylindrical projection scheme.
Figure 4:
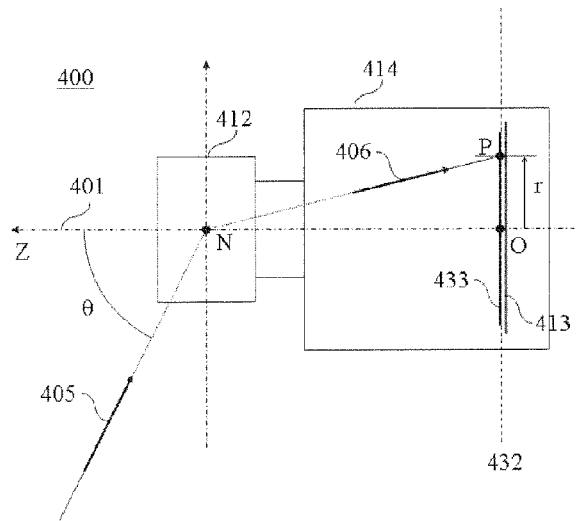
FIG. 4 is a conceptual drawing illustrating the real projection scheme of a general rotationally symmetric lens.
Figure 5:
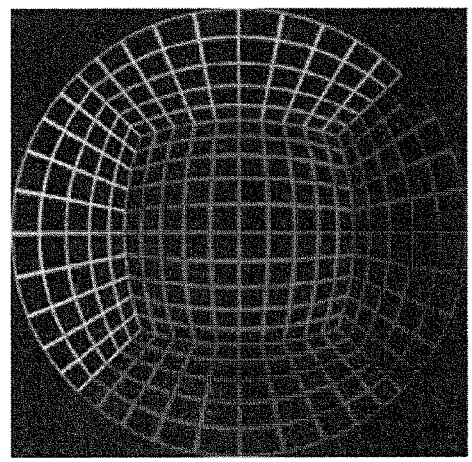
FIG. 5 is an exemplary image produced by a computer assuming that a fisheye lens with an equidistance projection scheme has been used to take the picture of an imaginary scene.
Figure 6:
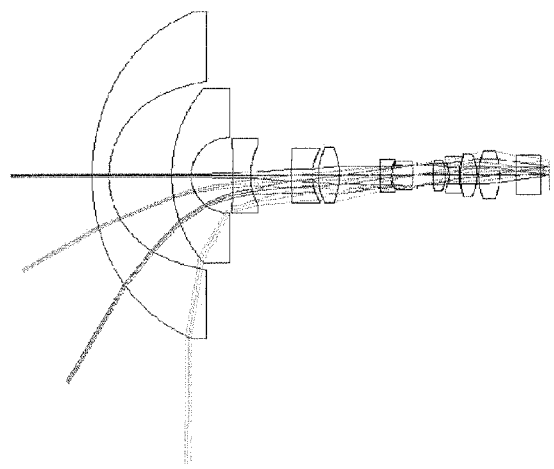
FIG. 6 is a diagram showing the optical structure of a refractive fisheye lens with a stereographic projection scheme along with the traces of rays.
Figure 7:
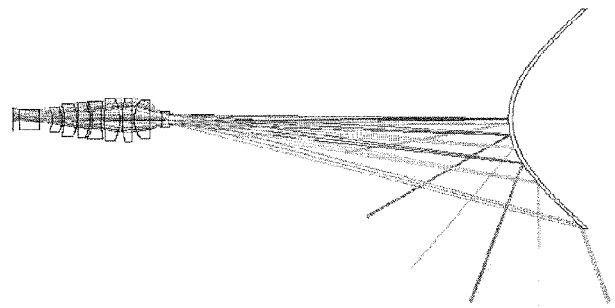
FIG. 7 is a diagram showing the optical structure of a catadioptric fisheye lens with a stereographic projection scheme along with the traces of rays.
Figure 8:
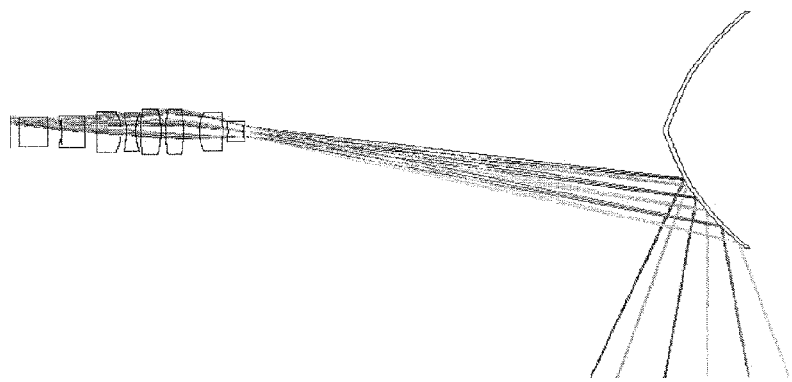
FIG. 8 is a diagram showing the optical structure of a catadioptric panoramic lens with a rectilinear projection scheme along with the traces of rays.
Figure 19:
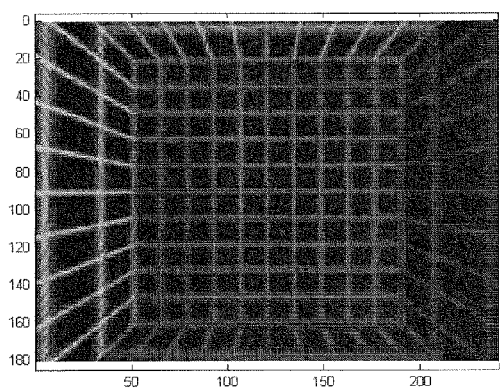
FIG. 19 is an exemplary rectilinear image with a horizontal FOV of 120° extracted from FIG. 5.
Figure 20:
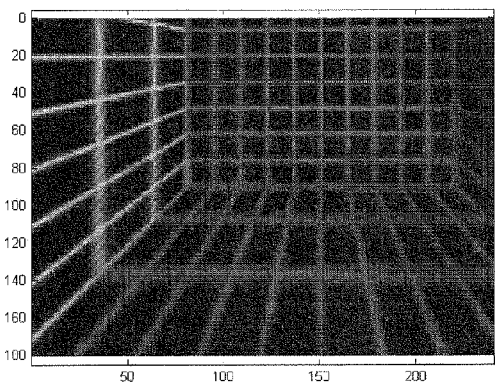
FIG. 20 is an exemplary rectilinear image after the application of slide and zoom operations.

FIG. 19 is a rectilinear image extracted from the fisheye image given in FIG. 5, wherein the lateral dimension of the processed image plane is 240 pixels, the longitudinal dimension is 180 pixels, the horizontal FOV is 120°, and there is no slide operation. As can be seen from FIG. 19, all the straight lines are captured as straight lines. On the other hand, FIG. 20 shows a rectilinear image, of which the parameters are identical to those of FIG. 19 except for the fact that the center of the processed image plane has been slid 70 pixels along the lateral direction and −30 pixels along the longitudinal direction.

Figure 21:
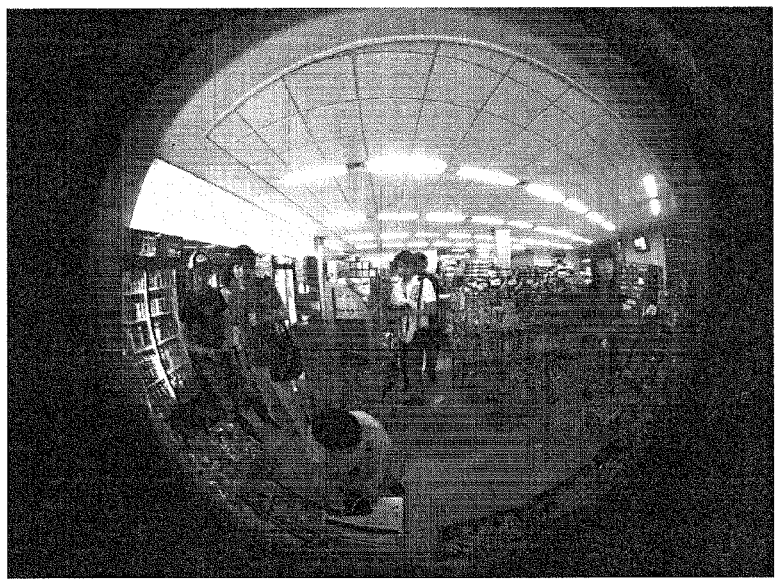
FIG. 21 is an exemplary image of an interior scene captured using a fisheye lens of the invention of a prior art.
Figure 22:
FIG. 22 is a panoramic image with a horizontal FOV of 190° and following a cylindrical projection scheme extracted from the fisheye image given in FIG. 21.

On the other hand, FIG. 21 is an exemplary image of an interior scene, which has been acquired by aligning the optical axis of a fisheye lens with 190° FOV described in references 14 and 15 parallel to the ground plane. The real projection scheme of this fisheye lens is described in detail in the said references. On the other hand, FIG. 22 is a panoramic image having a cylindrical projection scheme extracted from the fisheye image given in FIG. 21. Here, the width:height ratio of the processed image plane is 16:9, the position of the third intersection point coincides with the center of the processed image plane, and the horizontal FOV is set as 190°. As can be seen from FIG. 22, all the vertical lines are captured as vertical lines and all the objects appear natural. Slight errors are due to the error in aligning the optical axis parallel to the ground plane, and the error in experimentally determining the position of the optical axis on the uncorrected image plane.

Figure 23:
FIG. 23 is a rectilinear image with a horizontal FOV of 60° extracted from the fisheye image given in FIG. 21.

On the other hand, FIG. 23 is a rectilinear image extracted from FIG. 21 with the width:height ratio of 4:3, wherein the position of the third intersection point coincides with the center of the processed image plane, and the horizontal FOV is 60°. Here, it can be seen that all the straight lines in the world coordinate system are captured as straight lines in the processed image plane.

Second Embodiment

Figure 24:
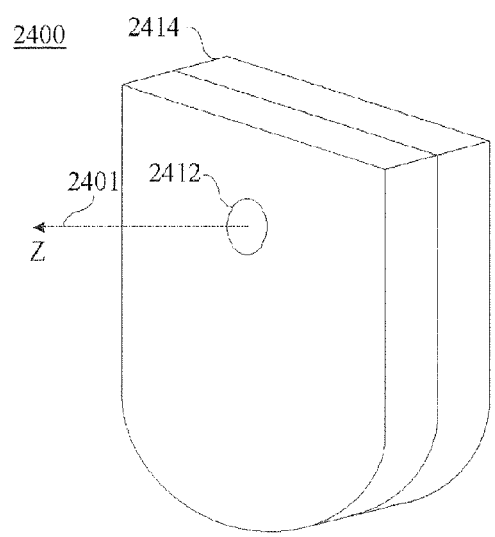
FIG. 24 is a schematic diagram of a panoramic camera phone embodying the conception of the present invention.

FIG. 24 shows one exemplary application wherein such an invention can be used. The built-in camera module is a very important factor in determining the market value of a cellular phone. If a panoramic picture can be taken with a cellular phone (2414), then the customer satisfaction will be greatly increased. Ordinary lens currently mounted in camera phones is comprised of 2~4 pieces of double aspherical lens elements, and has a mega pixel grade resolution with a typical FOV of 60°. On the other hand, it is possible to realize a fisheye lens with a FOV between 120° and 180° using 3~5 pieces of double aspherical lens elements. Furthermore, since high end processor such as an ARM core processor is typically embedded in cellular phones, it can handle the image processing load required to embody the conception of the current invention. Therefore, a panoramic camera phone can be realized by installing a wide-angle lens with more than 120° FOV, and endowing the image processing function to the electronic circuitry of the cellular phone. The resolution of the image sensor for such application is preferably more than 1M pixels. By utilizing such a camera phone, the user can obtain a panoramic image such as given in FIG. 22 or a rectilinear image such as given in FIG. 23.

A complication arises if it is desired to endow more than 180° FOV to the built-in lens for a cellular phone. If the lens does not protrude from the wall of the cellular phone, then the wall occlude the view of the lens even if the lens itself has a FOV which is larger than 180°. Therefore, in order to obtain a FOV which is greater than 180°, the lens must protrude from the wall of the cellular phone. However, due to the characteristics of a cellular phone being carried by the user all the time, a protruding lens can be scratched or stained. Considering this fact, a lens cover can be procured to cover the lens when the built-in camera is not in use. Another method is to make the camera module to come out from the wall of the cellular phone only when the phone camera is to be used. Finally, the easiest method is to make the FOV of the lens less than 170°. For such a FOV, the lens needs not protrude from the wall, and a fixed lens module is sufficient. Considering the fact that the horizontal FOV of a panoramic camera with a rotating lens is only 120°, it is apparent that such a FOV can be enough for the customer satisfaction.

Identical techniques can be used in PC camera or web camera, and the computing power for the necessary image processing can be provided by a PC connected to the PC camera, or a computer of another user connected to the Internet, or a network server. Furthermore, a fisheye image can be acquired using a digital camera equipped with a fisheye lens, then a panoramic image or a rectilinear image can be extracted using an image editing software running on PC.

Third Embodiment

If a camera equipped with a fisheye lens with 180° FOV is installed on an interior wall, then practically, there is no dead zone of security monitoring. It is because the region not captured by the camera is the wall that needs not be security-monitored. However, as has been stated previously, an image by a fisheye lens causes psychological discomfort due to its barrel distortion. On the other hand, although an ultra wide-angle image extracted in the manner of the first embodiment of the present invention captures most of the interior scene, captured objects far from the optical axis do not appear natural to the naked eye. In this case, the most natural looking image is a rectilinear image that can be acquired by heading the camera to the direction of the object.

A camera that can physically provide such an image is a camera equipped with a rectilinear lens and mounted on a pan•tilt stage. Since camera can be oriented to the direction that needs most attention, a most satisfactory image can be provided. Furthermore, images can be continuously produced while dynamically tracking a moving object such as a cat or an intruder. A method of realizing such functionality with software is provided as follows.

Due to the mathematical properties of three-dimensional rotations, different images are obtained depending on which of the two operations, namely a pan or a tilt operation has been taken first. In this embodiment, we assume that a pan operation has been taken first. Furthermore, as in the first embodiment, slide and zoom operations are allowed. However, slide and zoom operations must precede the pan operation, and the tilt operation is assumed to follow the pan operation. The coordinate system describing the objects prior to the pan operation is the world coordinate system, the coordinate system after the pan operation is the first world coordinate system, and the coordinate system after the tilt operation is the second world coordinate system. The X", Y" and Z"-axes of the second world coordinate system are respectively parallel to the x, y and z-axes of the first rectangular coordinate system.

First of all, as in the first embodiment of the present invention, the size (W, H) of the processed image plane and the horizontal FOV $\Delta\psi$ prior to the slide operation are determined. Then, the distance s" of the processed image plane is determined by Eq. 60. Next, a proper amount $(x''_c, y''_c)$ of slide operation is determined in order to obtain a desirable horizontal FOV ($\psi_{min} \leq \psi \leq \psi_{max}$) and a vertical FOV ($\delta_{min} \leq \delta \leq \delta_{max}$). Every object point on the object plane corresponding to the image point on the processed image plane has a zenith angle given by Eq. 56 and an azimuth angle given by Eq. 57. Then, the coordinate of an object point Q at an object distance R from the nodal point of the lens is given by Eqs. 71 through 74.

Math Figure 71

$$X = R \sin\theta \cos\phi \qquad [Math.71]$$

Math Figure 72

$$Y = R \sin\theta \sin\phi \qquad [Math.72]$$

Math Figure 73

$$Z = R \cos\theta \qquad [Math.73]$$

Math Figure 74

$$R = \sqrt{X^2 + Y^2 + Z^2} \qquad [Math.74]$$

Here, the object distance can take an arbitrary value, and can be taken as 1 for the sake of simplicity.

In the coordinate system of the current invention, pan operation is a rotational operation around the Y-axis, and tilt operation is a rotational operation around the X'-axis. The coordinate of a new point which corresponds to an object point in the world coordinate system having a coordinate (X, Y, Z) rotated around the Y-axis by angle $-\beta$ is given as (X', Y', Z'), and the coordinate of yet another point which corresponds to the said new point rotated around the X'-axis by angle $-\alpha$ is given as (X", Y", Z"). Utilizing the Euler matrices given in the first embodiment of the present invention, the coordinate of the new point is given by Eq. 75.

Math Figure 75

$$\vec{Q}'' = \begin{pmatrix} X'' \\ Y'' \\ Z'' \end{pmatrix} = M_{X'}(\alpha) M_Y(\beta) \begin{pmatrix} X \\ Y \\ Z \end{pmatrix} \qquad [Math.\ 75]$$

The following relation holds due to the mathematical properties of Euler matrices.

Math Figure 76

$$M_{X'}(\alpha) = M_Y(\beta) M_X(\alpha) M_Y(-\beta) \qquad [Math.76]$$

Therefore, Eq. 75 can be expressed in a simpler form as given below.

Math Figure 77

$$\begin{pmatrix} X'' \\ Y'' \\ Z'' \end{pmatrix} = M_Y(\beta) M_x(\alpha) \begin{pmatrix} X \\ Y \\ Z \end{pmatrix}$$ [Math. 77]

By calculating these rotational matrices, the coordinate of the new point is given by Eqs. 78 through 80.

Math Figure 78

$$X'' = X \cos \beta + Y \sin \beta \sin \alpha + Z \sin \beta \cos \alpha$$ [Math.78]

Math Figure 79

$$Y'' = Y \cos \alpha - Z \sin \alpha$$ [Math.79]

Math Figure 80

$$Z'' = -X \sin \beta + Y \cos \beta \sin \alpha + Z \cos \beta \cos \alpha$$ [Math.80]

The procedure for finding the coordinate of the first point from the coordinate of this new point is identical to that of the first embodiment.

Considering the fact that all the image sensors and display means are digital devices, image processing for a rectilinear projection scheme can be done using the procedure outlined below.

First, the size ($I_{max}$, $J_{max}$) of the processed image plane, the horizontal field of view $\Delta\psi$, the vertical field of view $\Delta\delta$, and the pixel distance s" from the nodal point of the lens to the processed image plane satisfying Eq. 81 are obtained.

Math Figure 81

$$s'' = \frac{J_{max} - 1}{2\tan\left(\frac{\Delta\psi}{2}\right)} = \frac{I_{max} - 1}{2\tan\left(\frac{\Delta\delta}{2}\right)}$$ [Math. 81]

The coordinate of the center of the processed image plane is given by Eq. 82.

Math Figure 82

$$(I_o, J_o) = \left(\frac{1 + I_{max}}{2}, \frac{1 + J_{max}}{2}\right)$$ [Math. 82]

Next, according to the needs, the displacement ($\Delta I$, $\Delta J$) of the said center from the third intersection point is determined. Once such preparatory stage has been completed, the zenith angle given in Eq. 83 and the azimuth angle given in Eq. 84 are calculated for all the pixels on the processed image plane.

Math Figure 83

$$\theta_{I,J} = \tan^{-1}\left\{\frac{\sqrt{(I - I_o + \Delta I)^2 + (J - J_o + \Delta J)^2}}{s''}\right\}$$ [Math. 83]

Math Figure 84

$$\phi_{I,J} = \tan^{-1}\left(\frac{I - I_o + \Delta I}{J - J_o + \Delta J}\right)$$ [Math. 84]

Next, the coordinate of the object point Q on the object plane having these zenith and azimuth angles is calculated using Eqs. 85 through 87.

Math Figure 85

$$X_{I,J} = \sin \theta_{I,J} \cos \phi_{I,J}$$ [Math.85]

Math Figure 86

$$Y_{I,J} = \sin \theta_{I,J} \sin \phi_{I,J}$$ [Math.86]

Math Figure 87

$$Z_{I,J} = \cos \theta_{I,J}$$ [Math.87]

Here, the object distance has been assumed as 1. Next, the coordinate of this object point in the second world coordinate system is calculated using Eqs. 88 through 90.

Math Figure 88

$$X''_{I,J} = X_{I,J} \cos \beta + Y_{I,J} \sin \beta \sin \alpha + Z_{I,J} \sin \beta \cos \alpha$$ [Math.88]

Math Figure 89

$$Y''_{I,J} = Y_{I,J} \cos \alpha - Z_{I,J} \sin \alpha$$ [Math.89]

Math Figure 90

$$Z''_{I,J} = -X_{I,J} \sin \beta + Y_{I,J} \cos \beta \sin \alpha + Z_{I,J} \cos \beta \cos \alpha$$ [Math.90]

From this coordinate, the zenith angle $\theta_{I,J}$ and the azimuth angle $\phi_{I,J}$ of the incident ray are calculated using Eqs. 91 and 92.

Math Figure 91

$$\theta_{I,J} = \cos^{-1}(Z''_{I,J})$$ [Math. 91]

Math Figure 92

$$\phi_{I,J} = \tan^{-1}\left(\frac{Y''_{I,J}}{X''_{I,J}}\right)$$ [Math. 92]

Next, the image height $r_{I,J}$ on the image sensor plane is calculated using Eq. 93.

Math Figure 93

$$r_{I,J} = r(\theta_{I,J})$$ [Math.93]

Next, the position of the second point on the uncorrected image plane is obtained from the position ($K_o$, $L_o$) of the second intersection point on the uncorrected image plane and the magnification ratio g.

Math Figure 94

$$x'_{I,J} = L_o + g r_{I,J} \cos(\phi_{I,J})$$ [Math.94]

Math Figure 95

$$y'_{I,J} = K_o + g r_{I,J} \sin(\phi_{I,J})$$ [Math.95]

Once the position of the second point has been found, the rectilinear image can be obtained using interpolation methods identical to those described in the first embodiment.

Figure 25:
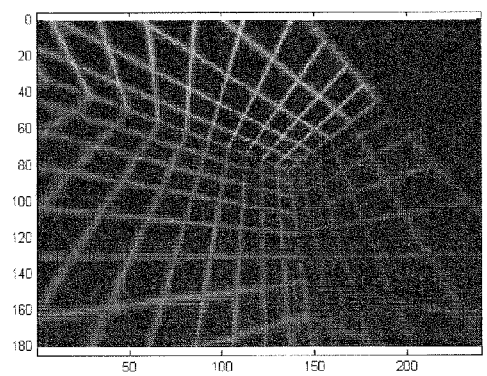
FIG. 25 is an exemplary rectilinear image obtained after applying pan•tilt operation to the fisheye image given in FIG. 5.
Figure 26:
FIG. 26 is an exemplary rectilinear image obtained after applying pan•tilt operation to the fisheye image given in FIG. 21.

FIG. 25 is a rectilinear image extracted from the fisheye image given in FIG. 5, wherein the lateral dimension of the processed image plane is 240 pixels, the longitudinal dimension is 180 pixels, the horizontal FOV prior to the slide•pan•tilt operations is 120°, there is no slide operation, and the rotation angles are given as $\alpha=\beta=30°$. As can be seen from FIG. 25, all the straight lines are captured as straight lines. On the other hand, FIG. 26 is a rectilinear image extracted from the fisheye image given in FIG. 21, wherein the lateral dimension of the processed image plane is 1280 pixels, the longitudinal dimension is 960 pixels, the horizontal FOV prior to the slide•pan•tilt operations is 70°, there is no slide operation, and the rotation angles are given as $\alpha=40°$ and $\beta=20°$.

Fourth Embodiment

Figure 27:
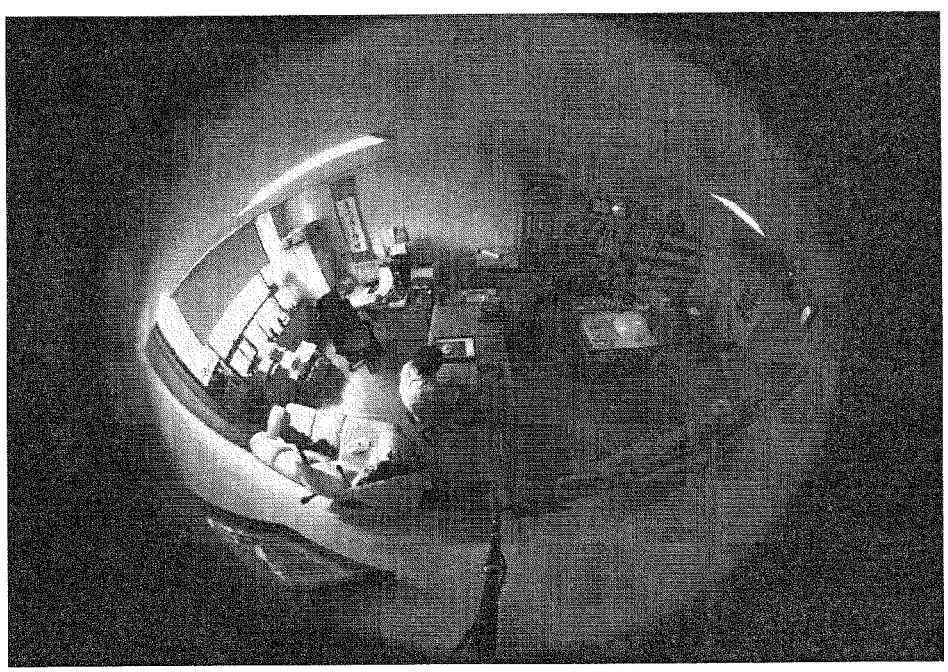
FIG. 27 is another exemplary image of an interior scene captured using a fisheye lens of the invention of a prior art.
Figure 28:
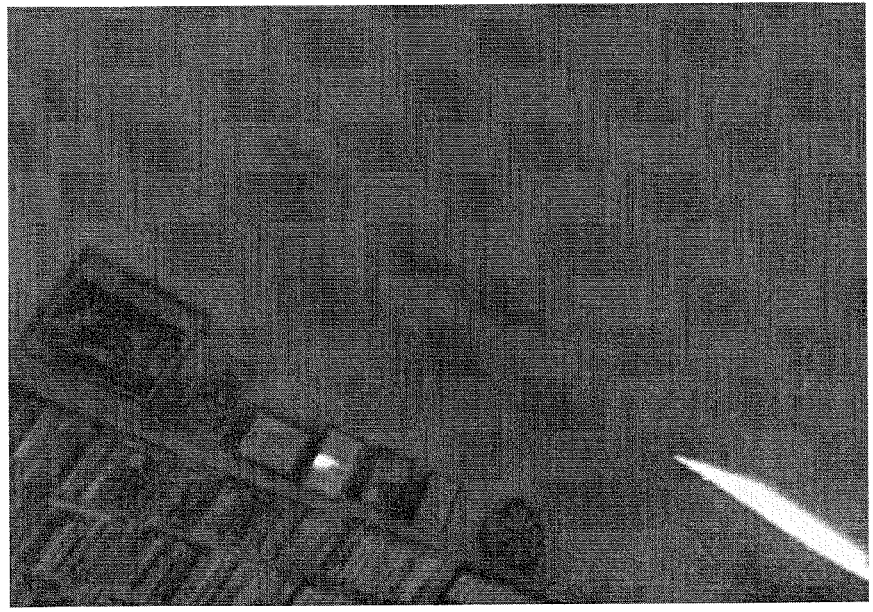
FIG. 28 is an exemplary rectilinear image obtained after applying pan•tilt operation to the fisheye image given in FIG. 27.

FIG. 27 is another exemplary image of an interior scene captured using a fisheye lens described in references 14 and 15, wherein the optical axis of the fisheye lens has been inclined downward from the horizontal plane toward the floor (i.e., nadir) by 45°. On the other hand, FIG. 28 is a rectilinear image extracted from FIG. 27 with pan•tilt operations. Specifically, the lateral dimension of the processed image plane is 1280 pixels, the longitudinal dimension is 960 pixels, the horizontal FOV prior to the slide•pan•tilt operations is 60°, there is no slide operation, and the rotation angles are given as $\alpha=45°$ and $\beta=50°$. From the figure, however, it can be seen that vertically extended objects such as the bookshelves appear slanted. In such a case, a satisfactory image can be obtained when the tilt operation precedes the pan operation. In other words, the method of extracting a rectilinear image presented in the third embodiment is a method wherein slide operation is taken first, and then the pan and the tilt operations follow in sequence. However, depending on the application area, it can be more advantageous if the order of the pan and the tilt operations are exchanged. Similar to the third embodiment of the present invention, the coordinate of a new point obtainable by taking the tilt and the pan operations in sequence is given by Eq. 96.

Math Figure 96

$$\begin{pmatrix} X'' \\ Y'' \\ Z'' \end{pmatrix} = M_Y(\beta)M_X(\alpha) \begin{pmatrix} X \\ Y \\ Z \end{pmatrix} = M_X(\alpha)M_Y(\beta) \begin{pmatrix} X \\ Y \\ Z \end{pmatrix} \quad [\text{Math. 96}]$$

By evaluating these rotational matrices, the coordinate of the object point in the second world coordinate system is given by Eqs. 97 through 99.

Math Figure 97

$$X''=X\cos\beta+Z\sin\beta \quad [\text{Math.97}]$$

Math Figure 98

$$Y''=X\sin\alpha\sin\beta+Y\cos\alpha-Z\sin\alpha\cos\beta \quad [\text{Math.98}]$$

Math Figure 99

$$Z''=-X\cos\alpha\sin\beta+Y\sin\alpha+Z\cos\alpha\cos\beta \quad [\text{Math.99}]$$

The procedure for finding the coordinate of the second point from the coordinate of the object point is identical to that given in the third embodiment.

Considering the fact that all the image sensors and display means are digital devices, image processing for the rectilinear projection scheme can be done using the procedure outlined below.

First, the size $(I_{max}, J_{max})$ of the processed image plane, the horizontal field of view $\Delta\psi$, the vertical field of view $\Delta\delta$, and the pixel distance $s''$ from the nodal point of the lens to the processed image plane satisfying Eq. 100 are obtained.

Math Figure 100

$$s'' = \frac{J_{max}-1}{2\tan\left(\frac{\Delta\psi}{2}\right)} = \frac{I_{max}-1}{2\tan\left(\frac{\Delta\delta}{2}\right)} \quad [\text{Math. 100}]$$

The coordinate of the center of the processed image plane is given by Eq. 101.

Math Figure 101

$$(I_o, J_o) = \left(\frac{1+I_{max}}{2}, \frac{1+J_{max}}{2}\right) \quad [\text{Math. 101}]$$

Next, according to the needs, the displacement $(\Delta I, \Delta J)$ of the said center from the third intersection point is determined. Once such preparatory stage has been completed, the zenith angle given in Eq. 102 and the azimuth angle given in Eq. 103 are calculated for all the pixels on the processed image plane.

Math Figure 102

$$\theta_{I,J} = \tan^{-1}\left\{\frac{\sqrt{(I-I_o+\Delta I)^2+(J-J_o+\Delta J)^2}}{s''}\right\} \quad [\text{Math. 102}]$$

Math Figure 103

$$\phi_{I,J} = \tan^{-1}\left(\frac{I-I_o+\Delta I}{J-J_o+\Delta J}\right) \quad [\text{Math. 103}]$$

Next, the coordinate of the object point Q on the object plane having these zenith and azimuth angles are calculated using Eqs. 104 through 106.

Math Figure 104

$$X_{I,J}=\sin\theta_{I,J}\cos\phi_{I,J} \quad [\text{Math.104}]$$

Math Figure 105

$$Y_{I,J}=\sin\theta_{I,J}\sin\phi_{I,J} \quad [\text{Math.105}]$$

Math Figure 106

$$Z_{I,J}=\cos\theta_{I,J} \quad [\text{Math.106}]$$

Next, the coordinate of this object point in the second world coordinate system is calculated using Eqs. 107 through 109.

Math Figure 107

$$X''_{I,J}=X_{I,J}\cos\beta+Z_{I,J}\sin\beta \quad [\text{Math.107}]$$

Math Figure 108

$$Y''_{I,J}=X_{I,J}\sin\alpha\sin\beta+Y_{I,J}\cos\alpha-Z_{I,J}\sin\alpha\cos\beta \quad [\text{Math.108}]$$

Math Figure 109

$$Z''_{I,J}=-X_{I,J}\cos\alpha\sin\beta+Y_{I,J}\sin\alpha+Z_{I,J}\cos\alpha\cos\beta \quad [\text{Math.109}]$$

From this coordinate, the zenith angle $\theta_{I,J}$ and the azimuth angle $\phi_{I,J}$ of the incident ray are calculated using Eqs. 110 and 111.

Math Figure 110

$$\theta_{I,J} = \cos^{-1}(Z''_{I,J})$$ [Math. 110]

Math Figure 111

$$\phi_{I,J} = \tan^{-1}\left(\frac{Y''_{I,J}}{X''_{I,J}}\right)$$ [Math. 111]

Next, the image height $r_{I,J}$ on the image sensor plane is calculated using Eq. 112.

Math Figure 112

$$r_{I,J} = r(\theta_{I,J})$$ [Math. 112]

Next, the position of the second point on the uncorrected image plane is obtained from the position ($K_o$, $L_o$) of the second intersection point on the uncorrected image plane and the magnification ratio g.

Math Figure 113

$$x'_{I,J} = L_o + gr_{I,J}\cos(\phi_{I,J})$$ [Math. 113]

Math Figure 114

$$y'_{I,J} = K_o + gr_{I,J}\sin(\phi_{I,J})$$ [Math. 114]

Once the position of the corresponding second point has been found, the rectilinear image can be obtained using interpolation methods identical to those described in the first and the second embodiments.

Figure 29:
FIG. 29 is an exemplary rectilinear image obtained after applying tilt•pan operation to the fisheye image given in FIG. 27.

FIG. 29 is a rectilinear image extracted from the fisheye image given in FIG. 27 with tilt and pan operations. Specifically, the lateral dimension of the processed image plane is 1280 pixels, the longitudinal dimension is 960 pixels, the horizontal FOV prior to the slide•pan•tilt operations is 60°, there is no slide operation, and the rotation angles are given as α=45° and β=50°. It can be seen from the figure that the bookshelves appear to stand in an upright position.

Figure 9:
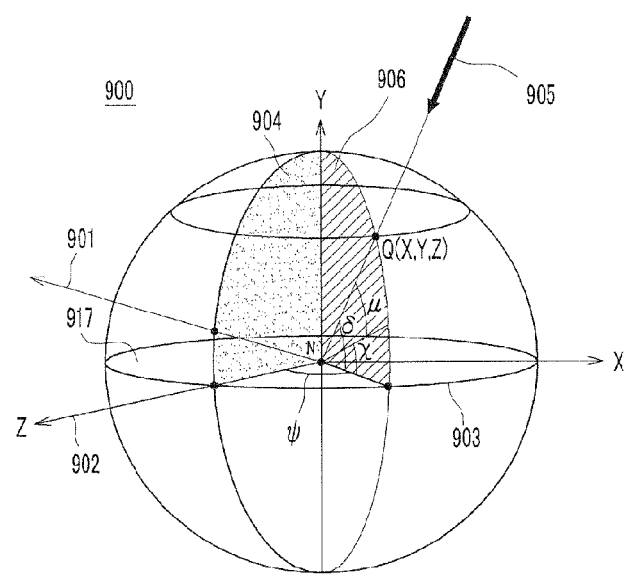
FIG. 9 is a conceptual drawing of the world coordinate system of the invention of a prior art.
Figure 10:
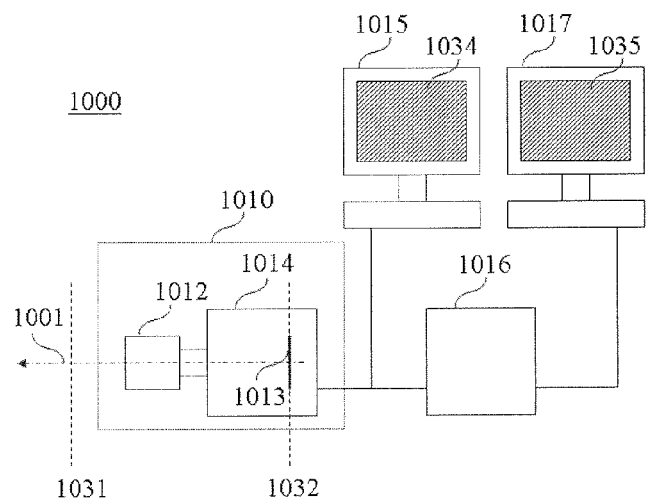
FIG. 10 is a schematic diagram of a panoramic imaging system of the invention of a prior art.
Figure 11:
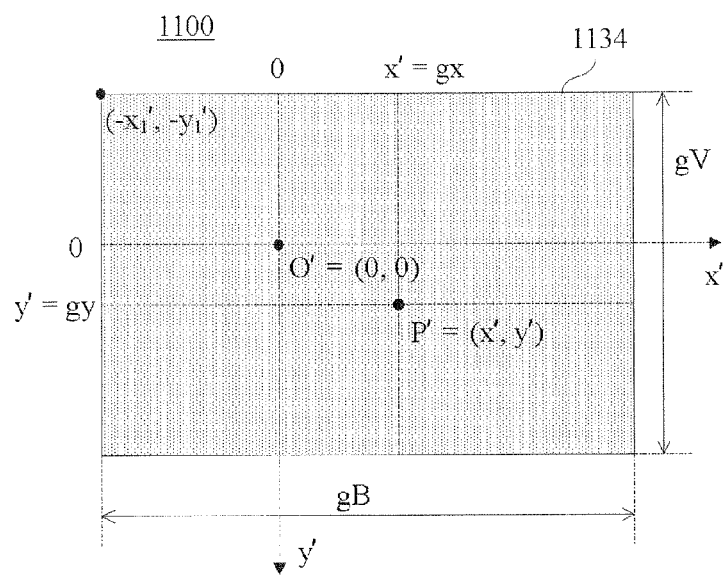
FIG. 11 is a conceptual drawing of an uncorrected image plane.
Figure 12:
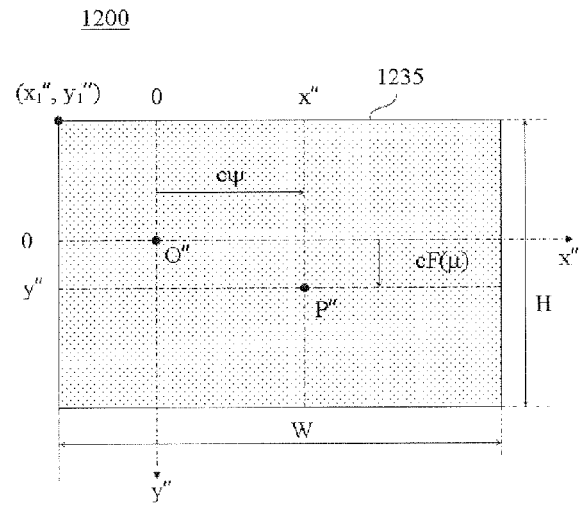
FIG. 12 is a conceptual drawing of a processed image plane that can be shown on an image display means.
Figure 30:
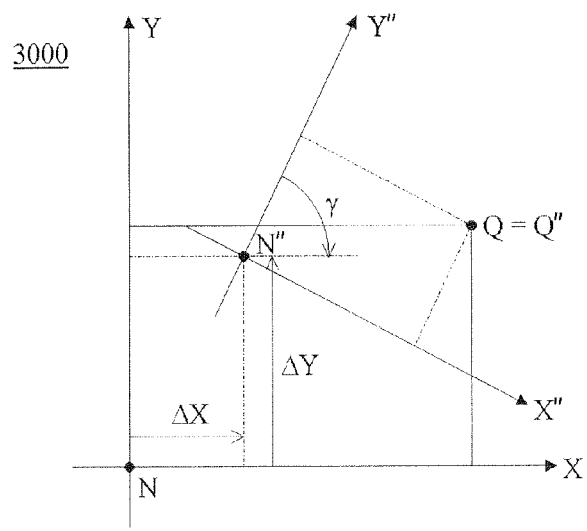
FIG. 30 is a conceptual drawing illustrating the most general second world coordinate system in rectilinear projection schemes.
Figure 31:
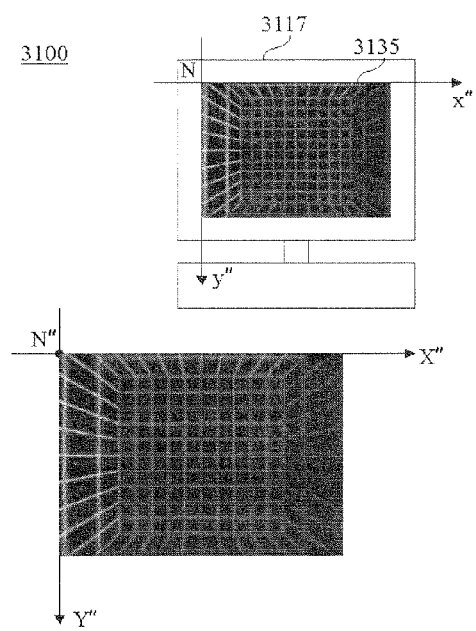
FIG. 31 is a schematic diagram showing the relation between the second world coordinate system and the processed image plane in rectilinear projection schemes.

Such rectilinear projection schemes can be summarized as follows. The world coordinate system employed by the imaging system of the current invention is schematically shown in FIG. 9. FIG. 30 shows the second world coordinate system (X", Y", Z"), which is obtainable by rotating and translating the world coordinate system (X, Y, Z) shown in FIG. 9. Specifically, the origin N" of the second world coordinate system shown in FIG. 30 is the origin N in the world coordinate system translated by ΔX along the X-axis direction, and by ΔY along the Y-axis direction. Then, the X"-axis and the Y"-axis are the X-axis and the Y-axis rotated around the Z-axis by angle γ, respectively, after the above translational operations. FIG. 31 illustrates that the coordinate (X", Y") of the object point in the second world coordinate systems is proportional to the coordinate (x", y") of the image point on the processed image plane. In other words, a relation given in Eq. 115 holds true.

Math Figure 115

$$\frac{X''}{x''} = \frac{Y''}{y''}$$ [Math. 115]

Generally speaking, a rectilinear projection scheme is a scheme wherein a second world coordinate system (X", Y", Z") exist such that the relation given in Eq. 115 holds true for all the image points (x", y") on the processed image plane, where the second world coordinate system (X", Y", Z") is a coordinate system obtainable by rotating and translating the said world coordinate system (X, Y, Z) in the three-dimensional space by arbitrary number of times and in random orders.

Fifth Embodiment

Figure 32:
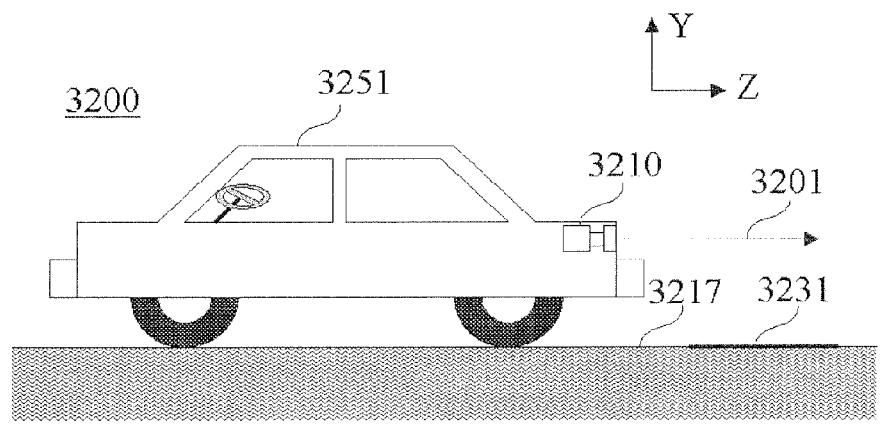
FIG. 32 is a schematic diagram of a car rear view camera employing slide•pan•tilt operations.

FIG. 32 is a schematic diagram of a car rear view camera utilizing the wide-angle imaging system of the current invention. The panoramic imaging system of the invention of a prior art described in reference 17 can be used as a car rear view camera in order to completely eliminate the dead zones in monitoring. Said fisheye lens can be installed inside a passenger car (3251) trunk for the purpose of monitoring the backside of a car without a dead zone. It can also be installed at the bumpers or at the rear window. However, considering the purpose of a rear view camera, the top of the trunk will be the ideal place to install a rear view camera. Furthermore, for buses and trucks, the rear view camera is desirably installed at the top of the rear end of the vehicle.

On the other hand, at the time of parking or backing up the car, the image of the immediate back area of the car will be most helpful rather than the view of a remote scenery. To acquire an image of the far behind area while driving the car, the optical axis (3201) of the image acquisition means (3210) will be aligned parallel to the ground plane (3217). Therefore, in order to visually check the obstacles lying behind the car or the parking lane, the pan•tilt operations presented in the first through the third embodiments of the present invention will be helpful.

Figure 33:
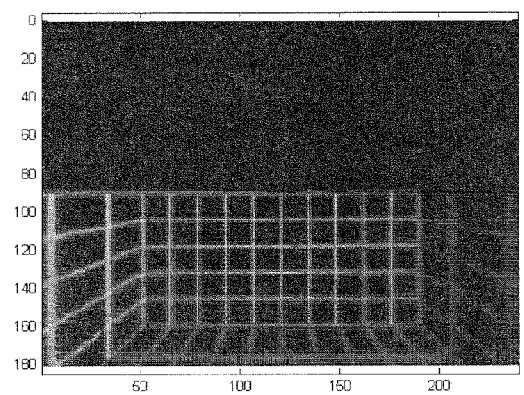
FIG. 33 is an exemplary rectilinear image obtained after applying tilt operation to the fisheye image given in FIG. 5.
Figure 34:
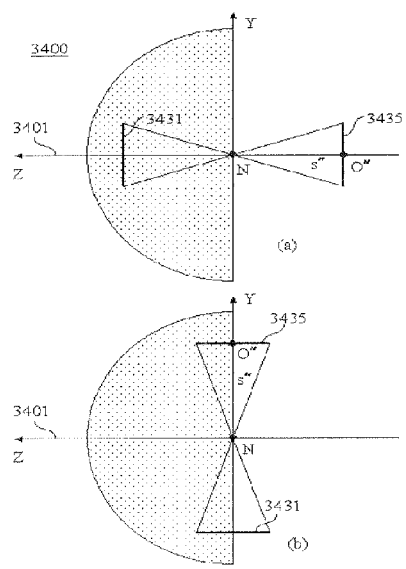
FIG. 34 is a conceptual drawing of an imaging system with large pan•tilt angles in absence of slide operation.

FIG. 33 is a rectilinear image extracted from the fisheye image given in FIG. 5. The lateral dimension of the processed image plane is 240 pixels, the longitudinal dimension is 180 pixels, the horizontal FOV prior to the slide•pan•tilt operations is 120°, there is no slide operation, and the rotation angles are given as α=90° and β=0°. Therefore, it corresponds to a case where a tilt operation has been taken without a pan operation. By the way, as can be seen from FIG. 33, only half of the screen contains meaningful image. The reason can be understood referring to FIG. 34. FIG. 34 has been drawn under the assumption that the FOV of the wide-angle lens of the image acquisition means is 180°. In absence of slide•pan•tilt operations as illustrated in FIG. 34(a), the processed image plane (3435) following a rectilinear projection scheme as well as the object plane (3431) are perpendicular to the optical axis, and all the object points on the object plane are within the FOV of the said lens. When the tilt angle becomes 90° as in FIG. 34(b), then half of the processed image plane (3435) and half of the object plane (3431) lie outside the FOV of the lens. Therefore, when a tilt operation with a tilt angle of 90° is taken purely in software, then a region where there is no visual information exists occupy half of the screen. Furthermore, referring to FIG. 32 and FIG. 34, the region outside the FOV of the lens is the vehicle's body, and therefore it is not really meaningful to monitor that area.

Figure 35:
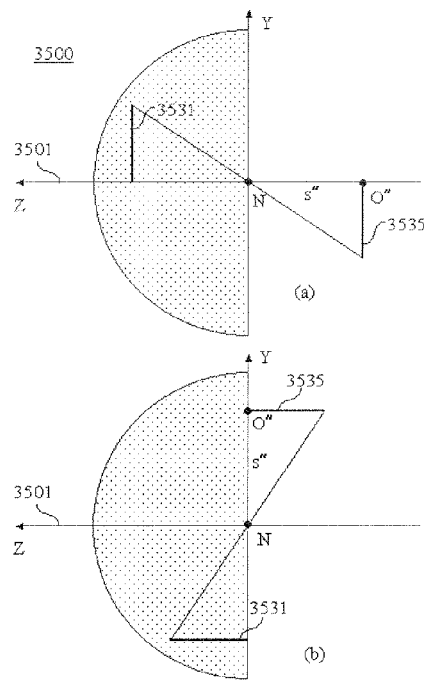
FIG. 35 is a conceptual drawing of an imaging system with large pan•tilt angles with a proper mix of slide operation.
Figure 36:
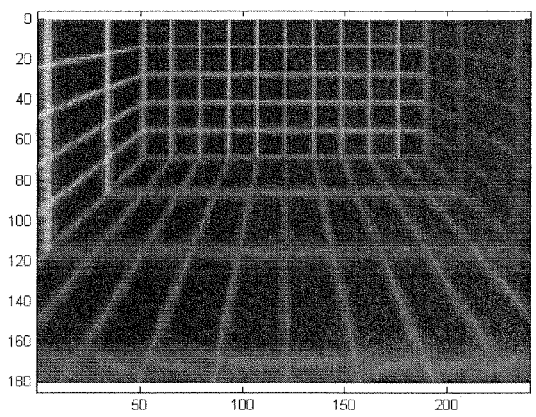
FIG. 36 is an exemplary rectilinear image obtained after applying slide and tilt operations to the fisheye image given in FIG. 5.

On the other hand, FIG. 35 shows a way to resolve such problem. If it is desired to make the pan or the tilt angle equal to 90° in order to make the principal direction of vision perpendicular to the optical axis, then as schematically shown in FIG. 35(a), it is preferable to apply a slide operation to the processed image plane (3535) first, so that object plane (3531) lies at the opposite side of the direction with respect to the optical axis along which a rotational operation is intended. Then, even if the tilt angle becomes 90° as in FIG. 35(b), the object plane remains within the FOV of the lens and a satisfactory rectilinear image is obtained. FIG. 36 is an example of a wide-angle image obtained by applying the slide operation before the tilt operation.

Figure 37:
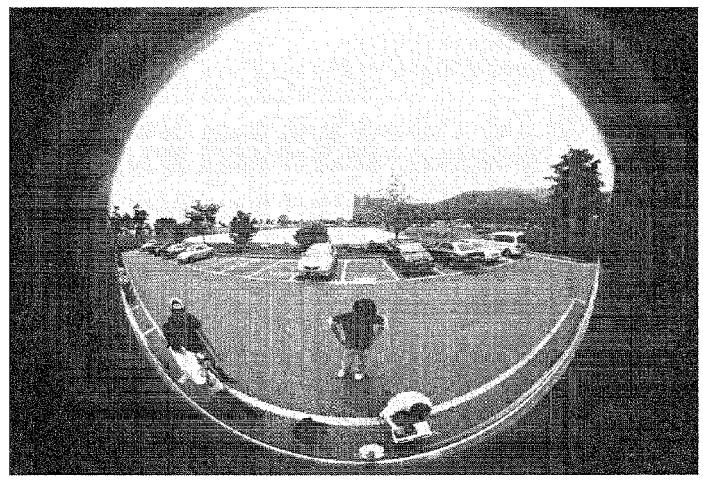
FIG. 37 is an exemplary image of an outdoor scene captured using a fisheye lens of the invention of a prior art.

FIG. 37 is yet another fisheye image obtained using the said fisheye lens with the optical axis aligned parallel to the ground plane. A camera equipped with the said fisheye lens has been set-up near the sidewall of a large bus and headed outward from the bus. The height of the camera was comparable to the height of the bus. As can be seen from FIG. 37, all the objects within a hemisphere including the sidewall of the bus have been captured in the image.

Figure 38:
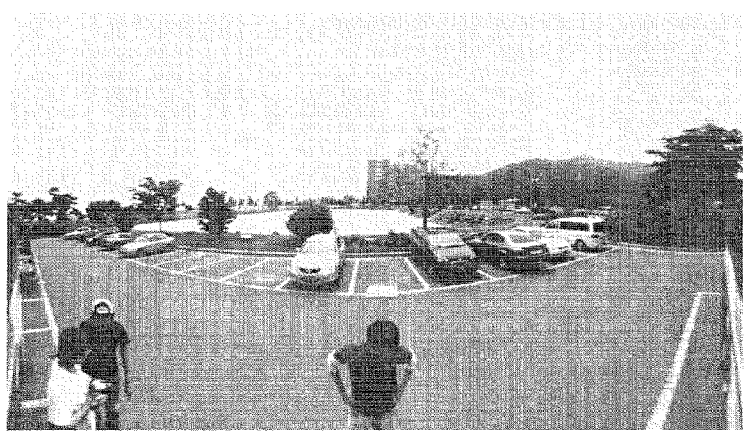
FIG. 38 is a panoramic image following a Mercator projection scheme extracted from the fisheye image given in FIG. 37.
Figure 39:
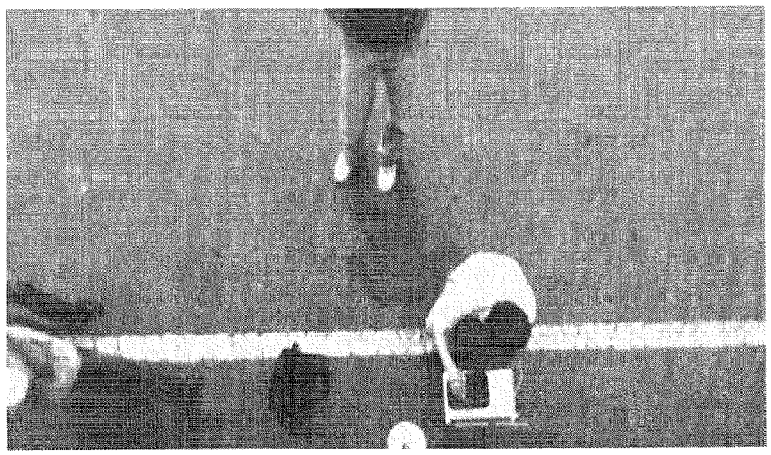
FIG. 39 is an exemplary rectilinear image obtained after applying tilt operation to the fisheye image given in FIG. 37.
Figure 40:
FIG. 40 is an exemplary rectilinear image obtained after applying pan•tilt operations to the fisheye image given in FIG. 37.

FIG. 38 is a panoramic image having a horizontal FOV of 190° extracted from FIG. 37. The used projection scheme is the Mercator projection scheme, and the coordinate of the third intersection point is $(I_o, J_o)=(1, J_{max}/2)$. On the other hand, FIG. 39 is a rectilinear image extracted from FIG. 37, of which the horizontal FOV is 90°, the tilt angle is −90°, and the size of the slide operation is $(\Delta I, \Delta J)=(-I_{max}/2, 0)$. On the other hand, FIG. 40 is another rectilinear image extracted from FIG. 37, of which the horizontal FOV is 90°, and the size of the slide operation is $(\Delta I, \Delta J)=(0, J_{max}/2)$. To obtain an image showing the front side of the bus, first, −100° pan operation has been applied and then subsequently −30° tilt operation has been applied.

Figure 41:
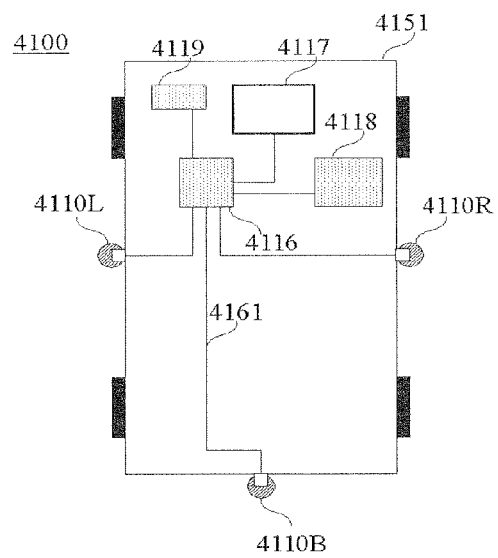
FIG. 41 is a schematic diagram of an imaging system for a vehicle embodying the conception of the present invention.

From the FIGS. 38 through 40, it can be seen that such an imaging system is useful as a camera for vehicles. FIG. 41 shows a schematic diagram of a car using such an imaging system. At least one camera (4110L, 4110R, 4110B) is installed at the outside wall of a vehicle (4151) such as a passenger car or a bus, and preferably identical fisheye lenses are installed on all the cameras. Furthermore, this camera can be installed parallel to the ground plane, vertical to the ground plane, or at an angle to the ground plane. Which one among these options is taken depends on the particular application area.

The fisheye images acquired from these cameras are gathered by the image processing means (4116), and displayed on the image display means (4117) after proper image processing operation has been taken, and it can be simultaneously recorded on an image recording means (4118). This image recording means can be a DVR (Digital Video Recorder).

Another device connected to this image processing means (4116) is a situation awareness module or an image selection means. This image selection means receives signal from the electronic circuitry of the car which indicates whether the car is running forward, backing up, or the driver gave the change-lane signal to turn to the left or to the right. Even when the vehicle is moving forward, it may be necessary to differentiate between a fast and a slow driving. Independent of all these signals, the driver can manually override the signals by manipulating the menus on the dashboard in order to force the projection scheme and the parameters of the image displayed on the image display means. Based upon such signals supplied by the image selection means, the image processing means provide the most appropriate images suitable for the current driving situation such as the images from the left-side camera (4110L) or the rear view camera (4110B).

Even if the rear view camera (4110B) is the only camera installed at the vehicle, the situation awareness module is still useful. For example, when the car is moving forward, panoramic image such as the one given in FIG. 22 or a rectilinear image parallel to the ground plane such as the one given in FIG. 23 can be extracted from the fisheye image acquired by the rear view camera and shown to the driver. When right turn signal lamp is lit, a pan•tilt image such as the one given in FIG. 40 can be shown to the driver. And, when back-up signal lamp is lit, then a tilted image such as the one given in FIG. 39 can be shown to the driver in order to avoid possible accidents.

When several cameras are simultaneously used as in FIG. 41, then each of the raw images from the respective camera can be separately image-processed, and then the processed images can be seamlessly joined together to form a single panoramic image or a rectilinear image. In this case, a more satisfactory image can be shown to the driver such as a bird's eye view providing image of the vehicle and its surroundings as if taken from the air.

In summary, imaging system for vehicles includes an image acquisition means for acquiring an uncorrected image plane which is equipped with a wide-angle lens rotationally symmetric about an optical axis, image processing means producing a processed image plane from the uncorrected image plane, image selection means determining the projection scheme and the parameters of the processed image plane, and image display means displaying the processed image plane on a screen with a rectangular shape. The projection schemes of the said processed image plane include a panoramic projection scheme and a rectilinear projection scheme. A vehicle is a device having an imaging system for vehicles.

The world coordinate system for this imaging system takes the nodal point of the wide-angle lens as the origin and a vertical line passing through the said origin as the Y-axis. When the coordinate of an image point on the said rectangular shaped screen corresponding to an object point in the world coordinate system having a coordinate (X, Y, Z) is given as (x", y"), then, said panoramic projection scheme is a scheme wherein straight lines parallel to the said Y-axis in the world coordinate system all appear as straight lines parallel to the y"-axis on the said screen, and two objects points having identical angular distance on the X-Z plane in the said world coordinate system has an identical distance along the x"-axis on the said screen. On the other hand, said rectilinear projection scheme is a scheme wherein an arbitrary straight line in the said world coordinate system appears as a straight line on the said screen.

Such a principle can be used in many other areas beyond the field of imaging systems for vehicles. For example, said device is a camera phone, and said image selection means is a menu button on the camera phone that a user can select. Or, said device is a PC camera, said image acquisition means is a USB CMOS camera with a fisheye lens, and said image processing means is software running on a computer. Or, said device is a digital camera, said image processing means is software running on a computer. In this case, said image acquisition means and said image processing means are two means which are separated not only physically but also in time. In other words, image acquisition means is a digital camera equipped with a fisheye lens and image processing means is image editing software running on a computer. Furthermore, image selection means is a menu button on the image editing software, and said image display means is of course the PC monitor.

Sixth Embodiment

Figure 42:
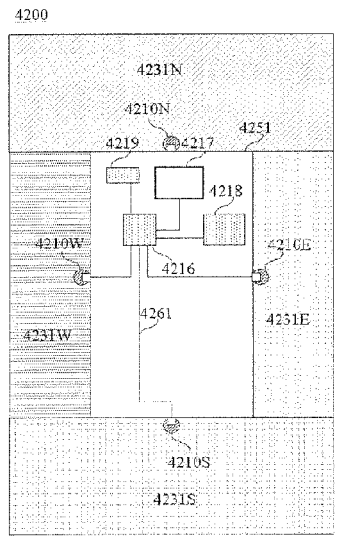
FIG. 42 is a schematic diagram of an imaging system for monitoring the surroundings of a building embodying the conception of the present invention.

FIG. 42 is a schematic diagram of a building monitoring system using the imaging system of the fourth embodiment. As shown in FIG. 42, one camera is installed at a high point on each wall of the building. Four cameras will be needed in general since typical building has a rectangular shape. If four walls of the building face the east, the west, the north, and the south, respectively, then a rectangular shaped region of the ground plane adjacent to the east wall of the building is assigned as the object plane for the east camera (4210E). Likewise, while corresponding object planes (4231W, 4231N, 4231S) are assigned for the west camera (4210W), the north camera (4210N), and the south camera (4210S), respectively, it is ensured that adjacent object planes are tightly neighbored to each other so that the building's surroundings can be monitored in its entirety without a dead spot. Desirably, each camera is installed heading vertically downward toward the ground plane, but a similar effect can be obtained by installing the cameras at an angle. After rectilinear images have been extracted from the images acquired by the installed cameras, the region of the image corresponding to the object plane illustrated in FIG. 42 are trimmed out. When, these images are all put together, a satisfactory image offering the view of the building's surroundings in a bird's eye view is obtained. In this case, also, situation awareness module (4219) displays various images on the image display means (4217) corresponding to the operation of the security personnel.

In the present embodiment, the procedure of assembling the rectilinear images extracted from each direction is called an image registration. Such an image registration technique is described in detail in reference 18, and basic principle is to calculate a correlation function from at least partially overlapping two sub-images and from the peak value of the correlation function, the amount of relative translation or rotation between the two images necessary for the two images to match at its best is determined.

Seventh Embodiment

Figure 13:
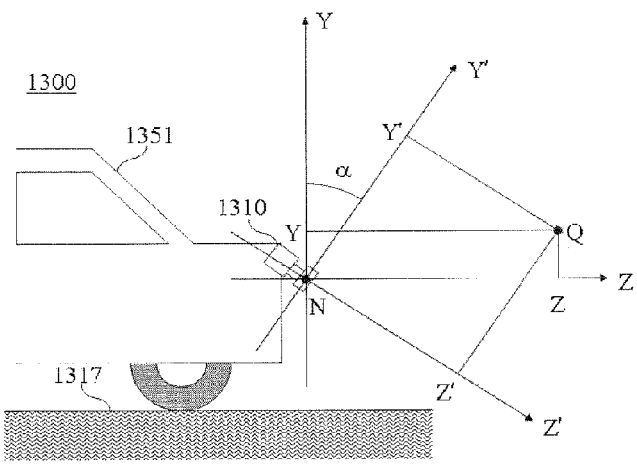
FIG. 13 is a schematic diagram of a car rear view camera employing a panoramic imaging system of the invention of a prior art.
Figure 14:
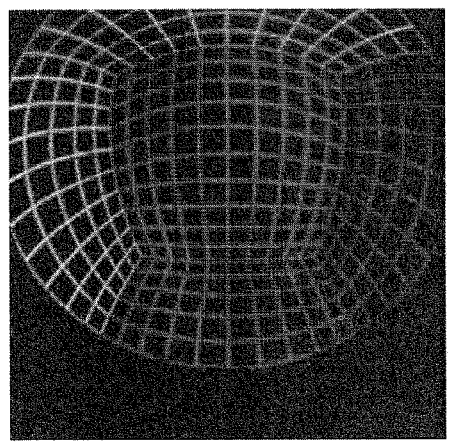
FIG. 14 is an exemplary fisheye image captured by an inclined imaging system.
Figure 15:
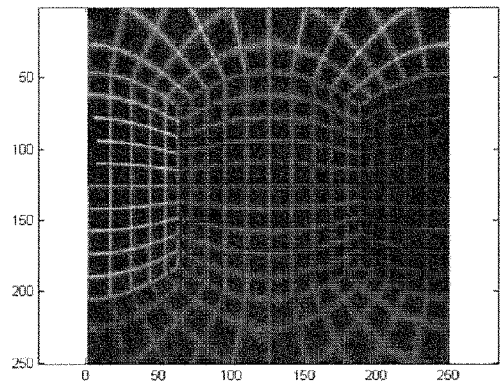
FIG. 15 is an exemplary panoramic image extracted from FIG. 14.
Figure 43:
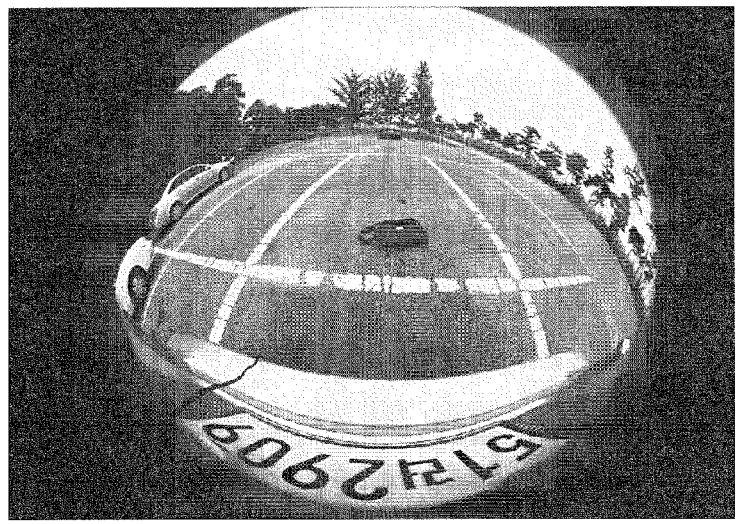
FIG. 43 is another exemplary image of an outdoor scene captured using a fisheye lens of the invention of a prior art.
Figure 44:
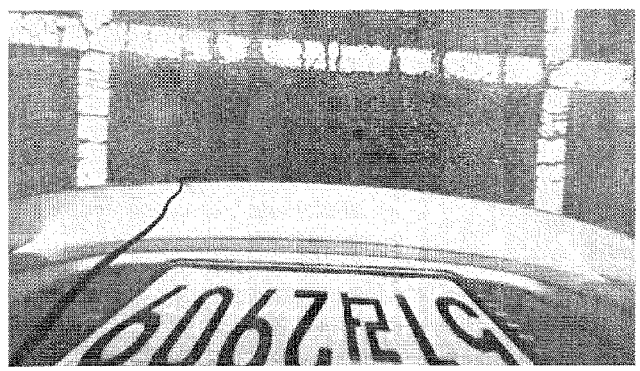
FIG. 44 is an exemplary rectilinear image extracted from the fisheye image given in FIG. 43.

FIG. 43 is an image acquired from a camera equipped with a fisheye lens, which is installed at the top of a passenger vehicle as illustrated in FIG. 13 with the camera tilt angle of −45°. As can be seen from FIG. 43, the FOV is so wide that even the vehicle's number plate can be read. On the other hand, FIG. 44 is a rectilinear image extracted from FIG. 43 having a horizontal FOV of 120° and −45° tilt angle. Here, it can be seen that the parking lane on the ground plane is clearly visible. However, it can be seen that the car rear bumper appears larger than the parking lane. Such a rectilinear image will not be of a much use for a parking assistance means. The reason the image appears in this way can be understood by referring to FIG. 45.

Figure 45:
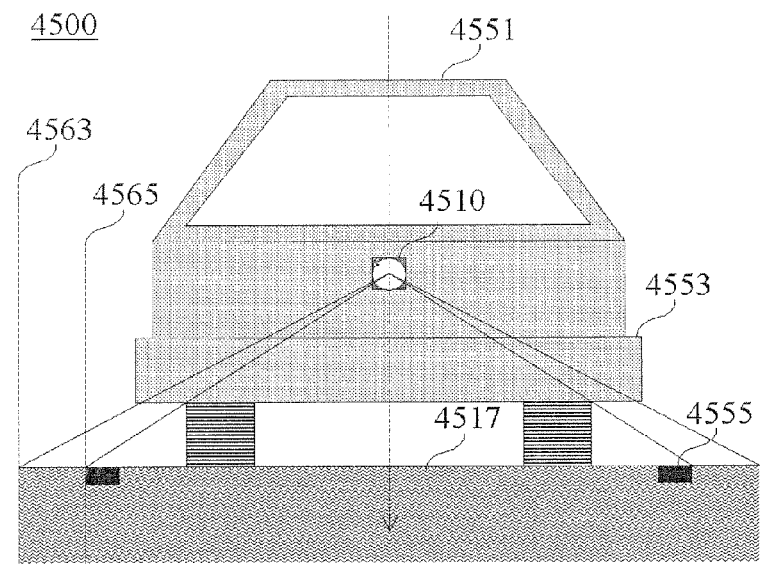
FIG. 45 is a schematic diagram for understanding the rectilinear image given in FIG. 44.

FIG. 45 is a schematic diagram of a case where a car rear view camera (4510) is installed near the top of a passenger car (4551)'s trunk. The characteristics of a camera providing a rectilinear image is identical to that of a pinhole camera. In FIG. 45, the width of the parking lane (4555) is needless to say wider than the width of the passenger car, or the rear bumper (4553). Therefore, the passenger car can be completed contained within the parking lane. However, when viewed from a rectilinear lens installed at the center, the bumper appears wider than the parking lane due to the height of the bumper. Viewed from the camera in FIG. 45, the boundary (4563) of the parking lane appears necessarily narrower than the boundary of the bumper (4563), and it has nothing to do with the projection scheme of the lens, but it is the result of a pure viewpoint. For the parking lane to appear wider than the bumper, the heights of the two objects must be similar, but this is practically impossible.

Figure 46:
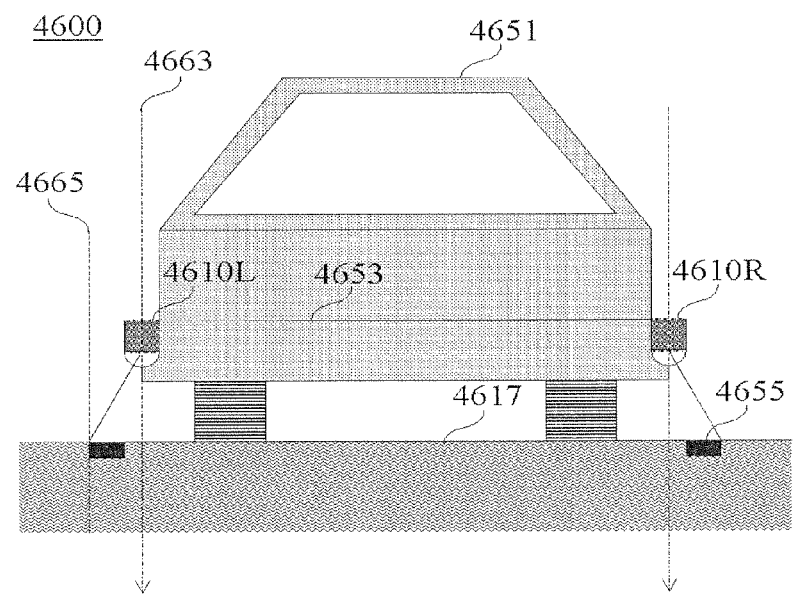
FIG. 46 is a schematic diagram illustrating a desirable method of installing cameras on a vehicle.

FIG. 46 is a schematic diagram of an imaging system for vehicles resolving the aforementioned problems. The cameras for vehicles are installed at each corner of the vehicle, and the optical axes are aligned perpendicular to the ground plane. For example, it can be installed at the corner of the bumper, which is a protruding end of the car. In this state of camera installation, precise location (4663) of the vehicle with respect to the ground plane is obtained independent of the height of the bumper, and therefore the distance to the parking lane can be accurately estimated while trying to park the vehicle. However, it is not mandatory to make the optical axis of the image acquisition means perpendicular to the ground plane, and it can even be parallel to the ground plane. Even when the optical axis of the image acquisition means makes an angle to the ground plane, an image identical to that of a camera with the optical axis perpendicular to the ground plane can be obtained by a proper combination of pan, tilt and slide operations.

Figure 47:
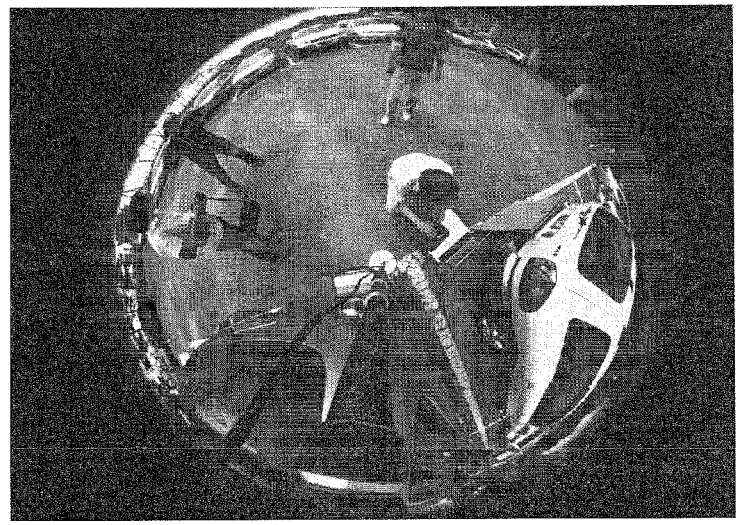
FIG. 47 is another exemplary image of an outdoor scene captured using a fisheye lens of the invention of a prior art.
Figure 48:
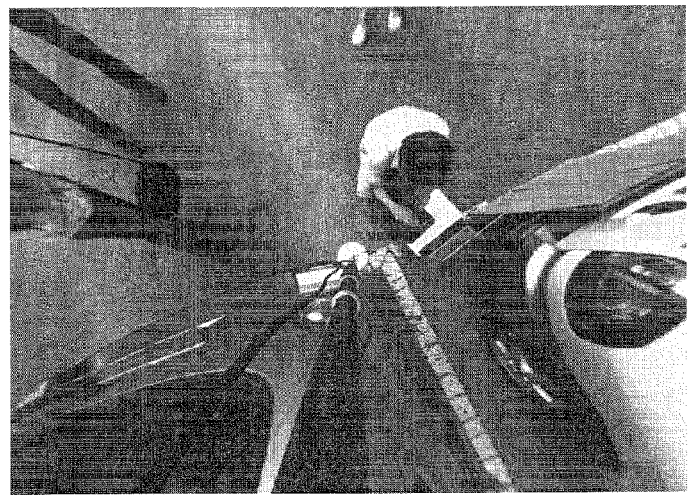
FIG. 48 is an exemplary rectilinear image extracted from the fisheye image given in FIG. 47.

FIG. 47 is an image obtained using a camera equipped with a fisheye lens, which is installed near the top of a recreational vehicle with the optical axis perpendicular to the ground plane, and FIG. 48 is a rectilinear image extracted from such a fisheye image. From FIG. 48, it can be seen that the vehicle and the parking lane appear well separated from each other.

Figure 49:
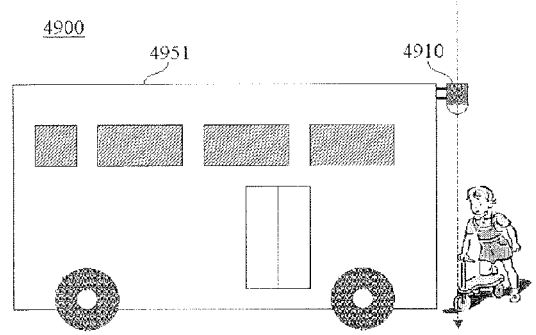
FIG. 49 is another schematic diagram illustrating a desirable method of installing cameras on a vehicle.

Such an imaging system will be particularly useful for a vehicle with a high stature such as a bus or a truck as schematically illustrated in FIG. 49. Since it is installed at a height higher than the stature of a man, the rectilinear images appear more natural, it is easier to maintain, and there is a less chance of breakage or defilement.

Such an imaging system for vehicles is characterized as comprised of the 1st and the 2nd image acquisition means for acquiring the 1st and the 2nd uncorrected image planes using wide-angle lenses rotationally symmetric about optical axes, an image processing means for extracting the 1st and the 2nd processed image planes following rectilinear projection schemes from the said 1st and the 2nd uncorrected image planes and subsequently generating a registered processed image plane from the 1st and the 2nd processed image planes, and an image display means for displaying the said registered processed image plane on a rectangular shaped screen. Said device is an automobile having said imaging systems for vehicles.

Preferably, said 1st and 2nd image acquisition means are installed at two corners of the rear end of the vehicle heading downward toward the ground plane, and said registered processed image plane contains the view of the said two corners.

Figure 50:
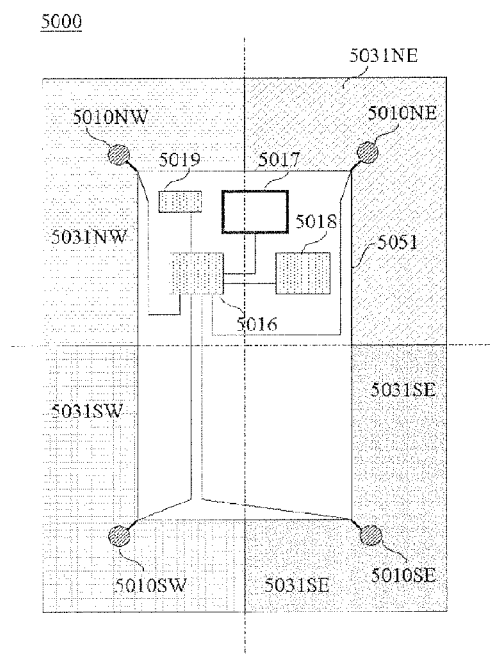
FIG. 50 is another schematic diagram of an imaging system for monitoring the surroundings of a building embodying the conception of the present invention.

On the other hand, FIG. 50 shows an imaging system for monitoring the outside of a building using the same principle. Here, the said device is the building itself. Such an imaging system for monitoring the outside of a building is characterized as comprised of the 1st through the 4th image acquisition means (5010NR, 5010NE, 5010SW, 5010SE) for acquiring the 1st through the 4th uncorrected image planes using wide-angle lenses rotationally symmetric about optical axes, an image processing means (5016) for extracting the 1st through the 4th processed image planes following rectilinear projection schemes from the said 1st through the 4th uncorrected image planes and subsequently generating a registered processed image plane from the 1st through the 4th processed image planes, and an image display means (5017) for displaying the said registered processed image plane on a rectangular shaped screen.

Preferably, the said 1st through the 4th image acquisition means are installed at the four corners of the building heading downward toward the ground plane, and the said registered processed image plane contains the view of the said four corners.

Eighth Embodiment

Figure 51:
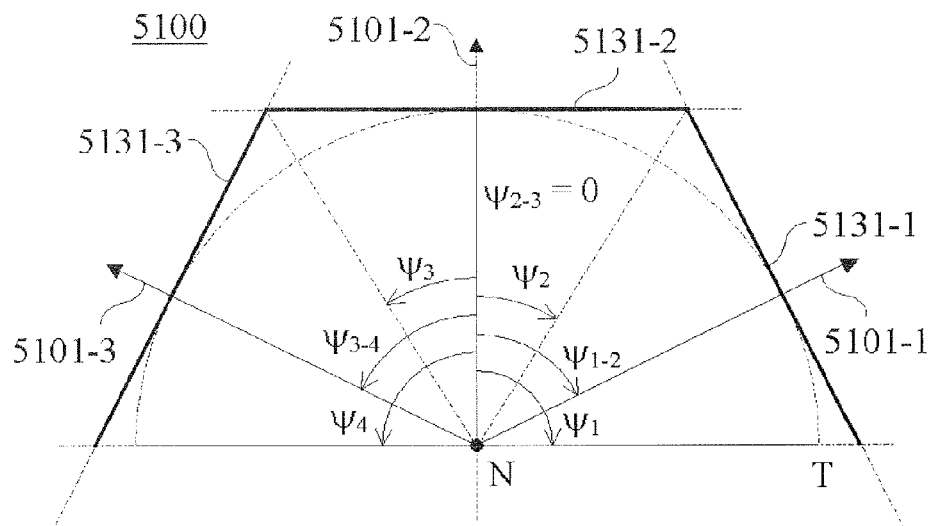
FIG. 51 is a conceptual drawing of the object plane in a multiple viewpoint panoramic imaging system.

Panoramic imaging system of the reference 17 requires a direction sensing means in order to constantly provide natural-looking panoramic images irrespective of the inclination of the device having the imaging system with respect to the ground plane. However, it may happen that additional installation of a direction sensing means may be difficult in terms of cost, weight, or volume for some devices such as motorcycle or unmanned aerial vehicle. FIG. 51 is a conceptual drawing of an object plane providing a multiple viewpoint panorama that can be advantageously used in such cases.

Object plane of the current embodiment has a structure where more than two sub object planes are joined together, where each of the sub object plane is a planar surface by itself. Although FIG. 51 is illustrated as a case where three sub object planes, namely 5131-1, 5131-2 and 5131-3 are used, a more general case of using n sub object planes can be easily understood as well. In order to easily understand the current embodiment, a sphere with a radius T centered on the nodal point of the lens is assumed. If a folding screen is set-up around the sphere while keeping the folding screen to touch the sphere, then this folding screen corresponds to the object plane of the current embodiment. Therefore, the n sub object planes are all at the same distance T from the nodal point of the lens. As a consequence, all the sub object planes have the identical zoom ratio or the magnification ratio.

In FIG. 51 using three sub object planes, the principal direction of vision (5101-1) of the 1st sub object plane (5131-1) makes an angle of $\psi_{1\text{-}2}$ with the principal direction of vision (5101-2) of the 2nd sub object plane (5131-2), and the principal direction of vision (5101-3) of the 3rd sub object plane (5131-3) makes an angle of $\psi_{3\text{-}4}$ with the principal direction of vision (5101-2) of the 2nd sub object plane (5131-2). The range of the horizontal FOV of the 1st sub object plane is from a minimum value $\psi_1$ to a maximum value $\psi_2$, and the range of the horizontal FOV of the 2nd sub object plane is from a minimum value $\psi_2$ to a maximum value $\psi_3$. By having the horizontal FOVs of adjacent sub object planes seamlessly continued, a natural looking multiple viewpoint panoramic image can be obtained.

Figure 52:
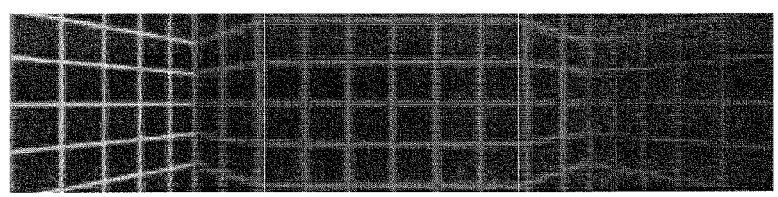
FIG. 52 is an exemplary multiple viewpoint panoramic image extracted from the fisheye image given in FIG. 5.

FIG. 52 is an example of a multiple viewpoint panoramic image extracted from FIG. 5, wherein each of the sub processed image plane is 240 pixels wide along the lateral direction and 180 pixels high along the longitudinal direction. Furthermore, the horizontal FOV of each of the sub object plane or the sub processed image plane is 60°, there is no slide operation for each sub object plane, and the distance to the sub object plane is identical for all the sub object planes. The pan angle for the 3rd sub object plane on the left side is −60°, the pan angle for the 2nd sub object plane in the middle is 0°, and the pan angle for the 1st sub object plane on the right side is 60°. Since, each of the three sub object planes has a horizontal FOV of 60°, the said three sub object planes comprise a multiple viewpoint panoramic image having an horizontal FOV of 180° as a whole. As can be seen from FIG. 52, all the straight lines appear as straight lines in each sub object plane.

Figure 53:
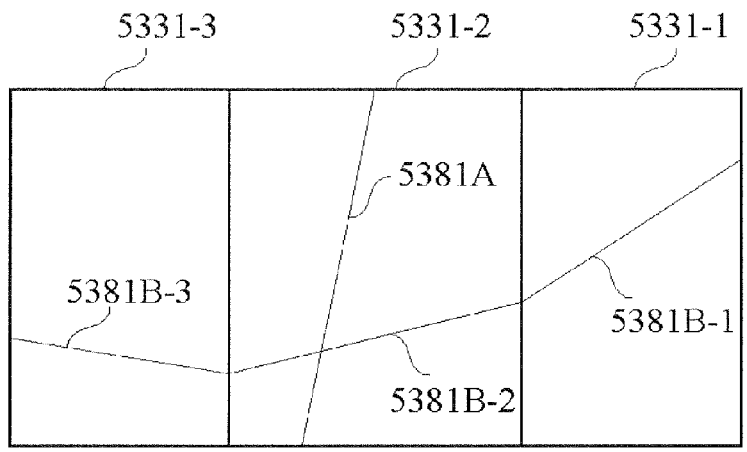
FIG. 53 is a conceptual drawing illustrating the notion of multiple viewpoint panoramic image.

FIG. 53 is a conceptual drawing illustrating the definition of a multiple viewpoint panoramic image. An imaging system providing a multiple viewpoint panoramic image includes an image acquisition means for acquiring an uncorrected image plane which is equipped with a wide-angle lens rotationally symmetric about an optical axis, an image processing means for extracting a processed image plane from the said uncorrected image plane, and an image display means for displaying the processed image plane on a screen with a rectangular shape.

Said processed image plane is a multiple viewpoint panoramic image, wherein the said multiple viewpoint panoramic image is comprised of the 1st through the nth sub rectilinear image planes laid out horizontally on the said screen, n is a natural number larger than 2, an arbitrary straight line in the world coordinate system having the nodal point of the wide-angle lens as the origin appears as a straight line (5381A) on any of the 1st through the nth sub rectilinear image plane, and any straight line in the world coordinate system appearing on more than two adjacent sub rectilinear image planes appears as a connected line segments (5381B-1, 5381B-2, 5381B-3).

Figure 54:
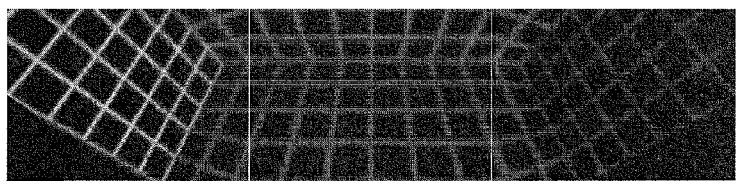
FIG. 54 is another exemplary multiple viewpoint panoramic image extracted from the fisheye image given in FIG. 5.

On the other hand, FIG. 54 is another multiple viewpoint panoramic image extracted from FIG. 5. This is a multiple viewpoint panoramic image obtained by first tilting the three sub object planes by −55°, and then subsequently panning the sub object planes by the same condition applied to FIG. 52. As can be seen from FIG. 54, even if the vertical lines in the world coordinate system are not parallel to the longitudinal side of the image sensor plane, they still appear as straight lines in the processed image plane. FIG. 55 is a multiple viewpoint panoramic image extracted from FIG. 37, and FIG. 56 is a multiple viewpoint panoramic image extracted from FIG. 27. In FIG. 55 and FIG. 56, each of the three sub object plane has a horizontal FOV of 190°/3.

FIG. 57 is another example of a fisheye image, and it shows the effect of installing a fisheye lens with 190° FOV on the center of the ceiling of an interior. FIG. 58 is a panoramic image extracted from the fisheye image given in FIG. 57. On the other hand, FIG. 59 is a multiple viewpoint panoramic image extracted from FIG. 57. Each sub object plane has a horizontal FOV of 360°/4, and it has been obtained by tilting all the sub object planes by −90° first, and subsequently panning the sub object planes by necessary amounts. From FIG. 59, it can be seen that such an imaging system will be useful as an indoor security camera. The following is the MatLab code used to obtain the image in FIG. 59.

% Image processing algorithm for generating a multiple viewpoint panoramic image from a fisheye image.

```
% format long
%
% *********** Real projection scheme *************************
coeff = [-3.101406e-2, 7.612269e-2, -1.078742e-1, 3.054932e-2,
1.560778, 0.0];
%
% *** Read in the graphic image **********
picture = imread('image', 'jpg');
[Kmax, Lmax, Qmax] = size(picture);
CI = double(picture) + 1;
%
Lo = 1040;
Ko = 750;
gain = 312.5; % ½-inch sensor
%
% Draw an empty canvas
Jmax = round(Lmax / 4); % canvas width
Imax = Jmax; % canvas height
Jo = (Jmax + 1) / 2;
Io = 1;
EI = zeros(Imax, 4 * Jmax + 3, 3); % dark canvas
%
Dpsi = 360.0 / 4.0 / 180.0 * pi;
T = (Jmax − 1) / 2.0 / tan(Dpsi / 2.0);
DI = 0;
DJ = 0;
%
ALPHA = 90.0;
alpha = ALPHA / 180.0 * pi;
sin_alpha = sin(alpha);
cos_alpha = cos(alpha);
%
% ********* Right side *******************************
% Virtual screen
Beta_o = 45.0;
```

-continued

```
for S = 0: 3
BETA = Beta_o + 360.0 * S / 4;
beta = BETA / 180.0 * pi;
sin_beta = sin(beta);
cos_beta = cos(beta);
%
for I = 1: Imax
for J = 1: Jmax
p = J - Jo + DJ;
q = I - Io + DI;
theta = atan(sqrt(p ^ 2 + q ^ 2) / T);
phi = atan2(q, p);
%
X = sin(theta) * cos(phi);
Y = sin(theta) * sin(phi);
Z = cos(theta);
%
Xp = X * cos_beta + Z * sin_beta;
Yp = X * sin_alpha * sin_beta + Y * cos_alpha - Z * sin_alpha *
cos_beta;
Zp = -X * cos_alpha * sin_beta + Y * sin_alpha + Z * cos_alpha *
cos_beta;
%
theta_p = acos(Zp);
phi_p = atan2(Yp, Xp);
r_p = gain * polyval(coeff, theta_p);
y_p = Ko + r_p * sin(phi_p);
x_p = Lo + r_p * cos(phi_p);
Km = floor(y_p);
Kp = Km + 1;
dK = y_p - Km;
Lm = floor(x_p);
Lp = Lm + 1;
dL = x_p - Lm;
if((Km >= 1) & (Kp <= Kmax) & (Lm >= 1) & (Lp <= Lmax))
EI(I, S * (Jmax + 1) + J, :) = (1 - dK) * (1 - dL) * CI(Km, Lm, :) ...
+ dK * (1 - dL) * CI(Kp, Lm, :) ...
+ (1 - dK) * dL * CI(Km, Lp, :) ...
+ dK * dL * CI(Kp, Lp, :);
else
EI(I, S * (Jmax + 1) + J, :) = zeros(1, 1, 3);
end
end
end
%
% ********* Lines ***********************************
for I = 1: Imax
EI(I, S * (Jmax + 1) + 1, :) = zeros(1, 1, 3);
end
end
DI = uint8(EI - 1);
imwrite(DI, 'result.jpg', 'jpeg');
imagesc(DI);
axis equal;
```

Ninth Embodiment

FIG. 60 is a schematic diagram of an exemplary image processing means embodying the conception of the present invention. The image processing means (6016) of the present invention has an input frame buffer (6071) storing one frame of image acquired from the image acquisition means (6010). If the image acquisition means (6010) is an analog CCTV, then it is necessary to decode NTSC, PAL, or Secam signals, and to deinterlace the two interlaced sub frames. On the other hand, this procedure is unnecessary for a digital camera. After these necessary procedures have been taken, the input frame buffer (6071) stores a digital image acquired from the image acquisition means (6010) in the form of a two dimensional array. This digital image is the uncorrected image plane. On the other hand, the output frame buffer (6073) stores an output signal in the form of a two dimensional array, which corresponds to the processed image plane (6035) that can be displayed on the image display means (6017). A central processing unit (CPU: 6075) further exists, which generates a processed image plane from the uncorrected image plane existing in the input frame buffer and stores in the output frame buffer. The mapping relation between the output frame buffer and the input frame buffer is stored in a non-volatile memory (6079) such as a SDRAM Flash memory in the form of a lookup table. In other words, using the algorithms from the embodiments of the current invention, a long list of pixel addresses for the input frame buffer corresponding to particular pixels in the output frame buffer is generated and stored. Central processing unit (6075) refers to this list stored in the nonvolatile memory in order to process the image.

Situation awareness module or an image selection means has been described in the previous embodiments of the current invention. The image selection means (6077) in FIG. 60 receives the signals coming from various sensors and switches connected to the imaging system and send them to the central processing unit. For example, by recognizing the button pressed by the user, it can dictate whether the original distorted fisheye image is displayed without any processing, or a panoramic image with a cylindrical or a Mercator projection scheme is displayed, or a rectilinear image is displayed. Said nonvolatile memory stores a number of list corresponding to the number of possible options a user can choose.

The image processing means of the embodiments of the current invention are preferably implemented on a FPGA (Field Programmable Gate Array) chip. In this case, the said central processing unit, the said input frame buffer, and the said output frame buffer can all be realized on the FPGA chip.

In the case where FPGA chip is used to realize the image processing means, it is not impossible to directly implement the algorithm of the embodiments of the current invention. However, implementing seemingly simple functions such as trigonometrical functions or division on FPGA chip is a quite challenging task, and requires a considerable resource. As has been described previously, a better alternative is to make an accurate look-up table using the developed algorithm, store the look-up table on a non-volatile memory, and do the image processing referring to this look-up table.

On the other hand, if the user prefers to be able to continuously change the pan or the tilt angle of rectilinear images, then it is impossible to prepare all the corresponding look-up tables in advance. In this case, the central processing unit can dynamically generate the look-up table referring to the algorithm and the parameters corresponding to the user's selection, and store them on a volatile or a non-volatile memory. Therefore, if the user does not provide a new input by appropriate means such as moving the mouse, then already generated look-up table is used for the image processing, and when a new input is supplied, then a corresponding look-up table is promptly generated and stored in the said memory.

In one preferable embodiment of the imaging system of the current invention, said image acquisition means is an analog CCTV equipped with a fisheye lens with more than 180° FOV, said image processing means is an independent device using a FPGA chip and storing the image processing algorithm on a non-volatile memory as a look-up table, and the said analog CCTV and the said image processing means are connected by signal and power lines.

Or, said image acquisition means is a network camera equipped with a fisheye lens with more than 180° FOV, said image processing means is an independent device using a FPGA chip and storing the image processing algorithm on a non-volatile memory as a look-up table, and the uncorrected image plane acquired by the said network camera is supplied to the said image processing means by the Internet.

Preferred embodiments of the current invention have been described in detail referring to the accompanied drawings. However, the detailed description and the embodiments of the current invention are purely for illustrate purpose, and it will be apparent to those skilled in the art that variations and modifications are possible without deviating from the spirits and the scopes of the present invention.

INDUSTRIAL APPLICABILITY

Such panoramic imaging systems and devices can be used not only in security•surveillance applications for indoor and outdoor environments, but also in diverse areas such as video phone for apartment entrance door, rear view camera for vehicles, visual sensor for robots, and also it can be used to obtain panoramic photographs using a digital camera.

The invention claimed is:

1. A method of obtaining a rectilinear image, the method comprising:
  acquiring an uncorrected image plane using a camera equipped with a wide-angle lens rotationally symmetric about an optical axis; and
  extracting a processed image plane from the uncorrected image plane,
  wherein,
  the uncorrected image plane is a two dimensional array with $K_{max}$ rows and $L_{max}$ columns,
  a pixel coordinate of the optical axis on the uncorrected image plane is $(K_o, L_o)$,
  a real projection scheme of the lens is an image height r obtained as a function of a zenith angle θ of a corresponding incident ray and given as r=r(θ),
  a magnification ratio g of the camera is given as $$g = \frac{r'}{r},$$

wherein r' is a pixel distance on the uncorrected image plane corresponding to the image height r,
  the processed image plane is a two dimensional array with $I_{max}$ rows and $J_{max}$ columns,
  a pixel coordinate of the optical axis on the processed image plane is $(I_o\text{-}\Delta I, J_o\text{-}\Delta J)$,
  wherein $(I_o, J_o)$ is given as $$(I_o, J_o) = \left(\frac{1+I_{max}}{2}, \frac{1+J_{max}}{2}\right),$$

and ΔI and ΔJ are arbitrary pixel distances,
  a video signal value for the pixel having a coordinate (I, J) on the processed image plane is given as a video signal value of an imaginary pixel on the uncorrected image plane having a coordinate $(x'_{I,J}, y'_{I,J})$,
  wherein the pixel coordinate $(x'_{I,J}, y'_{I,J})$ of the imaginary pixel is given by a following set of equations $$s'' = \frac{J_{max}-1}{2\tan\left(\frac{\Delta\psi}{2}\right)}$$

$$\theta_{I,J} = \tan^{-1}\left\{\frac{\sqrt{(I-I_o+\Delta I)^2 + (J-J_o+\Delta J)^2}}{s''}\right\}$$

-continued $$\phi_{I,J} = \tan^{-1}\left(\frac{I-I_o+\Delta I}{J-J_o+\Delta J}\right)$$

$$X_{I,J} = \sin\theta_{I,J}\cos\phi_{I,J}$$

$$Y_{I,J} = \sin\theta_{I,J}\sin\phi_{I,J}$$

$$Z_{I,J} = \cos\theta_{I,J}$$

$$X''_{I,J} = X_{I,J}\cos\beta + Y_{I,J}\sin\beta\sin\alpha + Z_{I,J}\sin\beta\cos\alpha$$

$$Y''_{I,J} = Y_{I,J}\cos\alpha - Z_{I,J}\sin\alpha$$

$$Z''_{I,J} = -X_{I,J}\sin\beta + Y_{I,J}\cos\beta\sin\alpha + Z_{I,J}\cos\beta\cos\alpha$$

$$\theta_{I,J} = \cos^{-1}(Z''_{I,J})$$

$$\phi_{I,J} = \tan^{-1}\left(\frac{Y''_{I,J}}{X''_{I,J}}\right)$$

$$r_{I,J} = r(\theta_{I,J})$$

$$x'_{I,J} = L_o + gr_{I,J}\cos(\phi_{I,J})$$

$$y'_{I,J} = K_o + gr_{I,J}\sin(\phi_{I,J})$$

wherein Δψ is an arbitrary angle smaller than 180°, and α and β are arbitrary angles.

2. A method of obtaining a rectilinear image, the method comprising;
  acquiring an uncorrected image plane using a camera equipped with a wide-angle lens rotationally symmetric about an optical axis; and
  extracting a processed image plane from the uncorrected image plane,
  wherein,
  the uncorrected image plane is a two dimensional array with $K_{max}$ rows and $L_{max}$ columns,
  a pixel coordinate of the optical axis on the uncorrected image plane is $(K_o, L_o)$,
  a real projection scheme of the lens is an image height r obtained as a function of a zenith angle θ of a corresponding incident ray and given as r=r(θ),
  a magnification ratio g of the camera is given as $$g = \frac{r'}{r},$$

wherein r' is a pixel distance on the uncorrected image plane corresponding to the image height r,
  the processed image plane is a two dimensional array with $I_{max}$ rows and $J_{max}$ columns,
  a pixel coordinate of the optical axis on the processed image plane is $(I_o\text{-}\Delta I, J_o\text{-}\Delta J)$,
  wherein $(I_o, J_o)$ is given as $$(I_o, J_o) = \left(\frac{1+I_{max}}{2}, \frac{1+J_{max}}{2}\right),$$

and ΔI and ΔJ are arbitrary pixel distances,
  a video signal value for the pixel having a coordinate (I, J) on the processed image plane is given as a signal value of an imaginary pixel on the uncorrected image plane having a coordinate) $(x'_{I,J}, y'_{I,J})$,
  wherein the pixel coordinate $(x'_{I,J}, y'_{I,J})$ of the imaginary pixel is given by a following set of equations $$s'' = \frac{J_{max} - 1}{2\tan\left(\frac{\Delta\psi}{2}\right)}$$

$$\theta_{I,J} = \tan^{-1}\left\{\frac{\sqrt{(I - I_o + \Delta I)^2 + (J - J_o + \Delta J)^2}}{s''}\right\}$$

$$\phi_{I,J} = \tan^{-1}\left(\frac{I - I_o + \Delta I}{J - J_o + \Delta J}\right)$$

$$X_{I,J} = \sin\theta_{I,J}\cos\phi_{I,J}$$

$$Y_{I,J} = \sin\theta_{I,J}\sin\phi_{I,J}$$

$$Z_{I,J} = \cos\theta_{I,J}$$

$$X''_{I,J} = X_{I,J}\cos\beta + Z_{I,J}\sin\beta$$

$$Y''_{I,J} = X_{I,J}\sin\alpha\sin\beta + Y_{I,J}\cos\alpha - Z_{I,J}\sin\alpha\cos\beta$$

$$Z''_{I,J} = -X_{I,J}\cos\alpha\sin\beta + Y_{I,J}\sin\alpha + Z_{I,J}\cos\alpha\cos\beta$$

$$\theta_{I,J} = \cos^{-1}(Z''_{I,J})$$

$$\phi_{I,J} = \tan^{-1}\left(\frac{Y''_{I,J}}{X''_{I,J}}\right)$$

$$r_{I,J} = r(\theta_{I,J})$$

$$x'_{I,J} = L_o + gr_{I,J}\cos(\phi_{I,J})$$

$$y'_{I,J} = K_o + gr_{I,J}\sin(\phi_{I,J})$$

wherein $\Delta\psi$ is an arbitrary angle smaller than 180°,
and $\alpha$ and $\beta$ are arbitrary angles.

3. An imaging system comprising:
an image acquisition means for acquiring an uncorrected image plane using a wide-angle lens rotationally symmetric about an optical axis,
an image processing means for extracting a processed image plane from the uncorrected image plane,
an image selection means for determining projection schemes and parameters of the processed image plane; and
an image display means for displaying the processed image plane on a screen with a rectangular shape,
wherein,
the projection schemes of the processed image plane include a panoramic projection scheme and a rectilinear projection scheme,
if the coordinate of an image point, which is on the rectangular screen, corresponding to an object point having a coordinate (X, Y, Z) in a world coordinate system having a nodal point of the wide-angle lens as an origin and a vertical line passing through the origin as the Y-axis and an intersection line between a reference plane, which is a plane containing both Y-axis and optical axis of the lens, and a horizontal plane perpendicular to the vertical line as a z-axis, is given as (x", y"),
the panoramic projection scheme is a scheme wherein a lateral coordinate x" of the image point is given by x"=c$\psi$ as a function of a horizontal incidence angle $\psi$ subtended by an incident ray originating from the object point and the reference plane,
wherein c is proportionality constant,
and the horizontal incidence angle is given by $$\psi = \tan^{-1}\left(\frac{X}{Z}\right),$$

a longitudinal coordinate y" of the image point is given by y"=cF($\mu$) as a function of an elevation angle $\mu$ of the incident ray,
the function F($\mu$) of the elevation angle $\mu$ of the incident ray is characterized by $$F(0) = 0$$

and $$\frac{\partial F(\mu)}{\partial \mu} > 0,$$

a vertical incidence angle $\delta$ subtended by the incident ray and the horizontal plane is given by $$\delta = \tan^{-1}\left(\frac{Y}{\sqrt{X^2 + Z^2}}\right),$$

the elevation angle $\mu$ is given by $\mu = \delta - \chi$,
wherein the angle $\chi$ is larger than $-90°$ and smaller than $90°$,
the rectilinear projection scheme is a scheme wherein a second world coordinate system (X", Y", Z") exists such that a relation given as $$\frac{X''}{x''} = \frac{Y''}{y''}$$

holds true for all image points (x", y") on the processed image plane,
wherein the second world coordinate system (X", Y", Z") is a coordinate system obtainable by rotating and translating the world coordinate system (X, Y, Z) in a three-dimensional space by arbitrary number of times and in random orders.

4. The imaging system of claim 3,
wherein the function F($\mu$) of the elevation angle $\mu$ of the incident ray is given by $$F(\mu) = \frac{\tan\mu}{\cos\chi}.$$

5. The imaging system of claim 3,
wherein the function F($\mu$) of the elevation angle $\mu$ of the incident ray is given by $$F(\mu) = \ln\left\{\tan\left(\frac{\mu}{2} + \frac{\pi}{4}\right)\right\}.$$

6. The imaging system of claim 3,
wherein the imaging system is a camera phone.

7. The imaging system of claim 3,
wherein the image processing means is software running on a computer,
and the imaging system is a PC camera.

8. The imaging system of claim 3,
wherein the image processing means is software running on a computer,
and the imaging system is a digital camera.

9. The imaging system of claim 3,
wherein the image acquisition means is a network camera equipped with a fisheye lens with more than 180·FOV,
the image processing means is an independent device using an FPGA chip and storing the image processing algorithm in a non-volatile memory as a look-up table,
and the uncorrected image plane acquired by the network camera is supplied to the image processing means through an Internet.

* * * * *